United States Patent
Pettit et al.

(10) Patent No.: US 11,102,251 B1
(45) Date of Patent: Aug. 24, 2021

(54) SYSTEMS AND METHODS FOR DEPLOYING CONFIGURATIONS ON COMPUTING DEVICES AND VALIDATING COMPLIANCE WITH THE CONFIGURATIONS DURING SCHEDULED INTERVALS

(71) Applicant: Kandji, Inc., San Diego, CA (US)

(72) Inventors: Adam Pettit, San Diego, CA (US); Wesley Pettit, San Diego, CA (US); Mark Daughters, San Diego, CA (US); Brandon Modesitt, Encinitas, CA (US)

(73) Assignee: Kandji, Inc., San Diego, CA (US)

( * ) Notice: Subject to any disclaimer, the term of this patent is extended or adjusted under 35 U.S.C. 154(b) by 147 days.

(21) Appl. No.: 16/530,290

(22) Filed: Aug. 2, 2019

(51) Int. Cl.
*H04L 29/06* (2006.01)
*H04L 12/24* (2006.01)

(52) U.S. Cl.
CPC .......... *H04L 63/205* (2013.01); *H04L 41/085* (2013.01); *H04L 41/0813* (2013.01)

(58) Field of Classification Search
CPC ....... H04L 63/205; H04L 43/00; H04L 67/34; H04L 67/10; H04L 41/08; H04L 41/0803; G06F 21/604; G06F 9/45558
USPC .......................................................... 726/1
See application file for complete search history.

(56) References Cited

U.S. PATENT DOCUMENTS

| | | |
|---|---|---|
| 7,136,858 B2 | 11/2006 | Malik |
| 7,249,187 B2 | 7/2007 | Sobel |
| 8,473,938 B1 | 6/2013 | Feeser |
| 9,218,178 B2 | 12/2015 | Young |
| 9,288,117 B1 * | 3/2016 | Angrish .................. H04L 43/00 |
| 9,350,681 B1 * | 5/2016 | Kitagawa ............ H04L 41/5096 |
| 9,727,326 B2 | 8/2017 | Ciudad |
| 9,948,617 B2 | 4/2018 | Wysocki |
| 10,708,125 B1 * | 7/2020 | Chen .................. H04L 65/1046 |
| 10,719,332 B1 * | 7/2020 | Dwivedi ............... G06F 16/245 |
| 10,944,654 B2 * | 3/2021 | Rimar .................. H04L 43/062 |

(Continued)

FOREIGN PATENT DOCUMENTS

WO WO-2013096758 A1 * 6/2013 ............. H04L 63/20

OTHER PUBLICATIONS

Braun et al., "A Web Portal for CMS Grid Job Submission and Management", 2010 (Year: 2010).*

(Continued)

*Primary Examiner* — Ondrej C Vostal
(74) *Attorney, Agent, or Firm* — MLO, a professional corp.

(57) ABSTRACT

Deploying configurations on computing devices and validating compliance with the configurations during scheduled intervals. Particular embodiments described herein include computing devices that send a requests to a management platform at different time periods for lists of configurations that are assigned to those computing devices at those different time periods. Received lists include identifiers of the configurations that are assigned to the those computing devices during the different time periods. Local agents on the computing devices use the received lists to determine if each of the configurations in that list are implemented. If a configuration is not implemented on a computing device, the local agent on that computing device implements that configuration or alerts the management platform that the configuration could not be implemented.

20 Claims, 15 Drawing Sheets

(56) References Cited

U.S. PATENT DOCUMENTS

| | | |
|---|---|---|
| 2003/0220945 A1 | 11/2003 | Malik |
| 2004/0103310 A1 | 5/2004 | Sobel |
| 2006/0179476 A1 | 8/2006 | Challener |
| 2007/0027965 A1* | 2/2007 | Brenes .................... H04L 51/00 709/220 |
| 2009/0059818 A1* | 3/2009 | Pickett ............... H04L 65/1069 370/259 |
| 2010/0050229 A1 | 2/2010 | Overby, Jr. |
| 2011/0249658 A1* | 10/2011 | Wohlert ................. H04L 67/24 370/338 |
| 2012/0331524 A1* | 12/2012 | Mower ................ H04L 67/125 726/3 |
| 2013/0014107 A1* | 1/2013 | Kirchhofer ........... G06F 9/5083 718/1 |
| 2014/0024400 A1* | 1/2014 | Kang ..................... H04W 4/12 455/466 |
| 2014/0082693 A1 | 3/2014 | Wackerly |
| 2014/0365624 A1* | 12/2014 | Whittemore ........... H04L 67/34 709/221 |
| 2016/0036667 A1* | 2/2016 | Kripalani ................ H04L 67/34 709/224 |
| 2016/0087940 A1* | 3/2016 | Miller ................ G06F 9/45558 726/15 |
| 2017/0013021 A1* | 1/2017 | Hoy ........................ H04L 67/10 |
| 2017/0212782 A1* | 7/2017 | Kurian ................ H04L 41/0843 |
| 2017/0364381 A1* | 12/2017 | Suber .................... G06F 9/4401 |
| 2018/0062923 A1* | 3/2018 | Katrekar ............. H04L 63/0272 |
| 2018/0165088 A1 | 6/2018 | Bonar |
| 2018/0239787 A1* | 8/2018 | Viol ...................... G06F 16/217 |
| 2018/0302385 A1 | 10/2018 | Wysocki |
| 2019/0018964 A1 | 1/2019 | Basehore |
| 2019/0278928 A1* | 9/2019 | Rungta ................... G06F 9/485 |
| 2020/0092294 A1* | 3/2020 | Sharma ................ G06F 21/604 |
| 2020/0274828 A1* | 8/2020 | Alapati ................ H04L 49/356 |

OTHER PUBLICATIONS

Cheng et al., "A service oriented framework for construction supply chain integration", 2009 (Year: 2009).*

Dipu, "Deployment of Wi-Fi Network", 2014 (Year: 2014).*

Fernandez et al., "BigDataDIRAC: deploying distributed Big Data applications", 2015 (Year: 2015).*

Gao et al., "Wireless Medical Sensor Networks in Emergency Response: Implementation and Pilot Results", 2008 (Year: 2008).*

Grguric et al., "The SmartHabits: An Intelligent Privacy-Aware Home Care Assistance System", 2018 (Year: 2018).*

Manuja et al., "Moving Agile based projects on Cloud", 2014 (Year: 2014).*

Murray, "An Investigation of Specifications for Migrating to a Web Portal Framework for the Dissemination of Health Information within a Public Health Network", 2002 (Year: 2002).*

Stoev et al., "Architectural framework for Dynamic Web-applications", 2008 (Year: 2008).*

Vecchio et al., "Evaluating Grid Portal Security", 2006 (Year: 2006).*

* cited by examiner

E.g., Provide interface for creating a set of configurations (selection of option to create new set)

E.g., Provide interface for creating a set of configurations (optionally select standard of configurations)

E.g., Provide interface for creating a set of configurations (activate configurations, and set parameters)

*E.g., Provide interface for editing previously generated sets of configurations (editing parameters of particular configurations)*

*E.g., Provide interface for a particular computing device to download a custom installer*

*E.g., Provide reports*

FIG. 4M

SYSTEMS AND METHODS FOR DEPLOYING CONFIGURATIONS ON COMPUTING DEVICES AND VALIDATING COMPLIANCE WITH THE CONFIGURATIONS DURING SCHEDULED INTERVALS

BACKGROUND

Security policies that govern the behavior of computing devices within a network vary by different enterprises, vary within different areas of an enterprise, and can vary for different computing devices. Instituting different security policies in addition to ensuring compliance with those policies are difficult and costly tasks for individual enterprises. If an enterprise were to internally institute security policies, that enterprise would need to create security software that configures different computing devices to behave in particular ways that comply with the security policies. Updates to the security software would be critical as standardized security procedures evolve to address security vulnerabilities that could be exploited by bad actors. However, updating software over time may not be feasible when internal resources for managing the updates are scarce or non-existent. Also, interpretation of security standards by personal within an enterprise can lead to inaccurate implementations of those standards, which can make an enterprise vulnerable to various risks. In some cases, proper interpretation of security standards requires hiring a consultant, which is a long and costly activity. Ensuring compliance by computing devices is also difficult and costly.

Allocation of finite IT resources within an enterprise is needed to build security software and maintain it over time. For enterprises with different policies for different computing devices, the effort and cost in developing security software can multiply with the number of policies, which further impacts the feasibility of relying on internal resources to build and maintain security software. Even if internal resources were used to build and maintain security software that is customized to the needs of an enterprise, that enterprise risks loss of its ability to efficiently and cost-effectively maintain security software under circumstances when an IT resource (e.g., employee or contractor) who built and had been maintaining the security software leaves with intimate knowledge about the coded structure of the software. Creating and maintaining internal software of any kind can require regular testing to ensure it functions as intended, which would be a further strain on finite resources. Adding the ability to report on compliance statuses of individual computers at different times would also add tremendous overhead that may not be feasible.

Improvements to implementing security policies and ensuring compliance of security policies over time while reducing use of finite IT resources are needed. Such improvements should by customizable, eliminate any need for using IT resources to develop or maintain software code, suggest configurations for complying with industry standards, regularly enforce compliance of individual computing devices over time, and report statuses of compliance for each computing device on an on-going basis.

BRIEF DESCRIPTION OF THE DRAWINGS

FIG. 4A through 4M depict user interfaces that illustrate embodiments of particular steps from FIG. 2 and FIG. 3.

DETAILED DESCRIPTION

Figure 1:
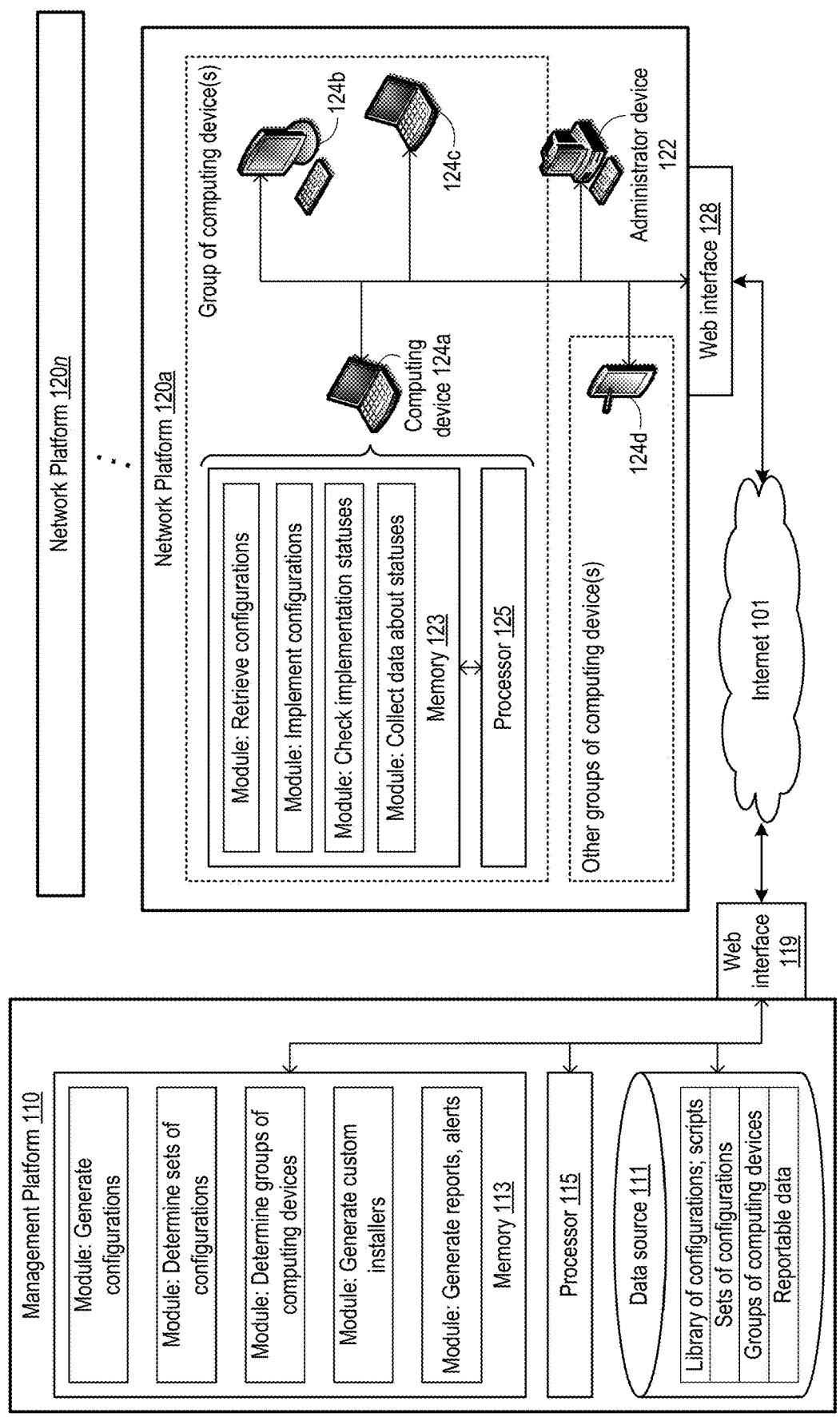
FIG. 1 depicts an operational environment in which systems and methods for deploying configurations on computing devices and validating compliance with the configurations during scheduled intervals may operate.

Enterprises (e.g., businesses or other organizations) that consider developing and maintaining their own security software face many issues, including: significant costs; burden on finite IT resources that are unable to properly maintain security software; security breaches resulting from improper implementation of industry standards; and potential loss of institutional knowledge that is necessary for maintaining security software under circumstances when IT resources that built or maintained the software leave the enterprise. Even if security software could initially configure computing devices to comply with a set of security policies, ensuring compliance by those computing devices over time may not be possible given finite resources and other factors.

Improved systems and methods for implementing security policies of an enterprise on different computing devices and validating compliance with the security policies during regular intervals are described below. The improved systems and methods offer different advantages, including: simultaneous use by multiple enterprises to implement and monitor compliance of different security policies of those enterprises; easy and quick customization of different security policies for different computing devices within an enterprise; efficient implementation of security policies based on standards; ability to enforce any number of security policies for any number of computing device groups; easy modification of security policies over time; monitoring of compliance on an on-going basis; and real-time reporting of compliance.

Security policies in the improved systems and methods can be implemented using configurations that define particular behaviors of computing devices, where those behaviors are required by the security policies. For example, one configuration may require that a parameter be set on a computing device that ensures placement of a Wi-Fi status indicator on a menu bar of an operating system's graphical user interface. Another configuration may require that a firewall is enabled on a computing device. Another configuration may require activation of a screen saver on a computing device after a defined period of inactivity (e.g., 5 minutes).

The improved systems and methods utilize a data source for storing an expansive pre-built library of configurations, some of which can be customized with different values of variables. The pre-built library is updated as needed over time. Collections of configurations that are based on compliance standards are also determined and stored over time.

The improved systems and methods utilize a web portal for:
  suggesting collections of configurations based on standardized security policies;
  allowing administrators of different enterprises to select configurations that represent security policies of interest to those enterprises, and to optionally select different sets of configurations for different polices that apply to different groups of computing devices;

allowing administrators of different enterprises to select groups of computing devices that need to comply with particular sets of configurations;

allowing administrators of different enterprises to edit sets of configurations and groups of computing devices over time as circumstances change; and providing, to administrators of different enterprises, generated reports detailing whether particular computing devices are complying with selected configurations or have not complied with particular configurations.

The improved systems and methods utilize a local agent installed on each computing device for implementing selected configurations, checking compliance with current configurations over time, remediating non-compliance of particular configurations either automatically or by prompting manual action by an end user of the non-compliant computing device, and reporting compliance status per configuration at regular intervals.

The improved systems and methods store historical compliance statuses to track compliance over time.

Attention is initially drawn to an operational environment illustrated in FIG. 1 in which systems and methods for deploying configurations on computing devices and validating compliance with the configurations during scheduled intervals may operate. As shown in FIG. 1, the environment includes a management platform 110 in communication with one or more network platforms 120a-n via the internet 101 or another suitable communication pathway.

The management platform 110 provides many different functionalities, including: maintaining available configurations, and also maintaining collections of configurations that are based on security standards; receiving administrator selections of configurations that apply to identified groups of computing devices; providing local agents to the identified computing devices to register computing devices, and to enable implementation and remediation of configurations; providing selected configurations and any modules needed to implement the configurations to computing devices; and generating reports that detail compliance statuses of computing devices.

Figure 2:
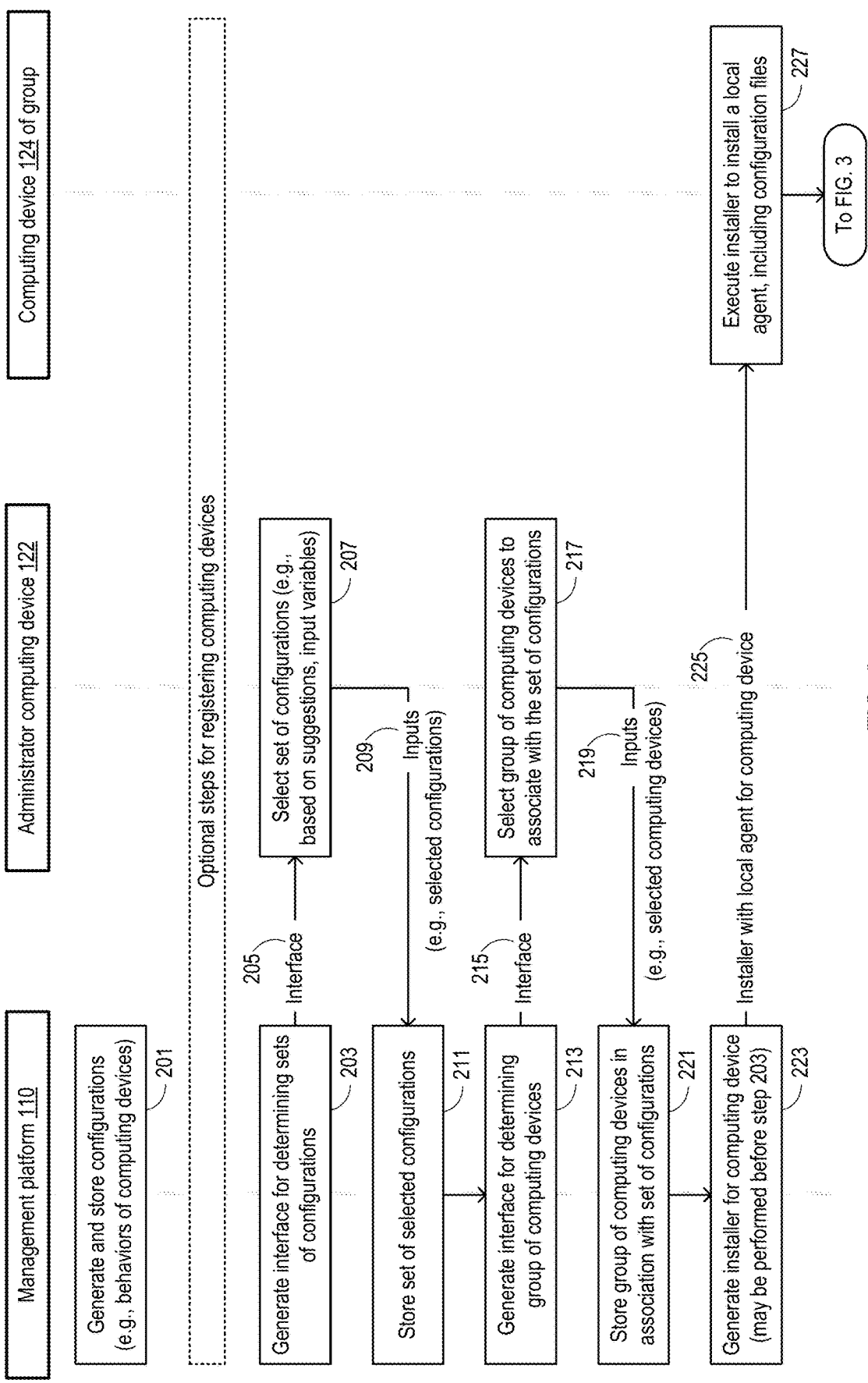
FIG. 2 depicts a process for determining sets of configurations to associate with groups of computing devices.
Figure 3:
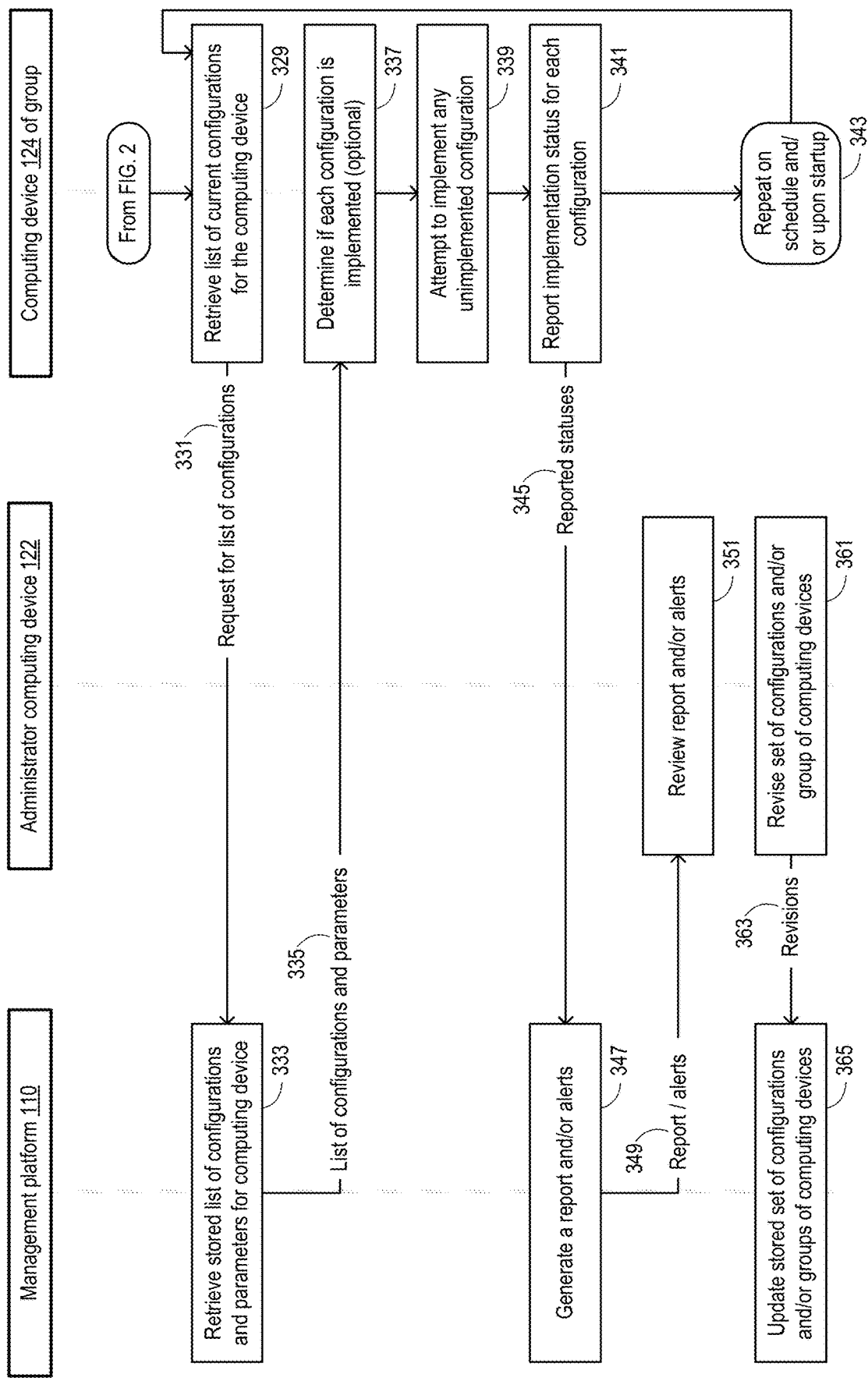
FIG. 3 depicts a process for implementing a set of configurations on a computing device and validating compliance with the configurations during scheduled intervals.

The management platform 110 includes one or more data sources 111 that store different data that is used during methods for determining sets of configurations to associated with groups of computing devices (FIG. 2) and methods for implementing a set of configurations on a computing device and validating compliance with the configurations during scheduled intervals (FIG. 3). As shown, the data stored in the data sources 111 specifies or represents a library of separate configurations or collections of configurations, sets of configurations selected by administrators of network platforms 120a-n, groups of computing devices selected by administrators of network platforms 120a-n, and reportable data that is determined from data reported by groups of computing devices. Individual, pre-built scripts for implementing individual configurations are also stored in the data source 111.

The management platform 110 also includes memory 113 for storing computer software instructions—e.g., different software modules—that are used to carry out different aspects of methods for determining sets of configurations to associated with groups of computing devices (FIG. 2) and for implementing a set of configurations on a computing device and validating compliance with the configurations during scheduled intervals (FIG. 3). Examples of modules include: module(s) for generating configurations (e.g., see step 201 of FIG. 2); module(s) for determining sets of configurations (e.g., see steps 203 through 211 of FIG. 2); module(s) for determining groups of computing devices (e.g., see steps 213 through 221 of FIG. 2); module(s) for generating installers of local agents (e.g., see step 223 of FIG. 2); and module(s) for generating reports and alerts (e.g., see step 347 of FIG. 3). Other modules associated with other steps performed by the management platform during the processes of FIG. 2 and FIG. 3 are also contemplated even if not shown in FIG. 1. Details of each module will become more apparent during the discussion of steps in FIG. 2 and FIG. 3 below, which may be implemented by executing instructions of different modules.

The management platform 110 also includes one or more processors 115 for executing computer software instructions. Examples of processors include servers or other suitable machines.

A web interface 119 can also be used by the management platform 110 to enable communication with the network platforms 120a-n via the internet 101. Connections among the components of the management platform 110 may be provided using any suitable wired or wireless communication pathways.

A network platform 120 includes a network of an enterprise on which different computing devices 124 operate. A network platform 120 can include a single location or multiple different locations from which different computing devices 124 have access to network resources of the network platform 120 (e.g., databases, a local area network, email servers, etc.), where access to different network resources requires the computing devices 124 to behave in particular ways (e.g., be configured with particular parameters). By way of example, the network platform 120a may include an administrator device 122, and one or more computing devices 124 that are operated by one or more users. A web interface 128 can also be used by the network platform 120a to enable communication with the management platform 110 via the internet 101.

The administrator device 122 includes a computing device operated by an administrator of the network platform 120a. Functions of the administrator device 122 are further described in FIG. 2 and FIG. 3, and include using a web-based portal to select sets of configurations to apply to groups of computing devices within the network platform 120a, and also using a web-based portal to review reports detailing configuration compliance status at each computing device to which configurations apply.

The computing devices 124 may each include memory 123 for storing computer software instructions—e.g., different software modules—that are used to carry out different aspects of a method for implementing a set of configurations on a computing device and validating compliance with the configurations during scheduled intervals (FIG. 3). Examples of modules include: module(s) for retrieving configurations (e.g., see step 329 of FIG. 3); module(s) for implementing configurations (e.g., see step 339 of FIG. 3); module(s) for checking implementation statuses (e.g., see step 337 of FIG. 3); and module(s) for collecting data about statuses (e.g., see step 341 of FIG. 3). The functionality of these modules can be performed by a local agent that is installed on the computing devices. Other modules associated with other steps performed by the computing device during the processes of FIG. 2 and FIG. 3 are also contemplated even if not shown in FIG. 1. Each of the computing devices 124 may include one or more processors 125 for executing computer instructions of the modules, data sources (not shown) for storing the collected data, user interfaces (not shown) for allowing a user to provide inputs and receive outputs, and means for communicating with the management platform 110 (e.g., the web interface 128 of the network platform 120a, or another interface of the computing device 124a).

Connections among the components of each computing device may be provided using any suitable wired or wireless communication pathways. Connections among the devices of each network platform may be provided using any suitable wired or wireless communication pathways.

Details about different methods involved in deploying configurations on computing devices and validating compliance with the configurations during scheduled intervals are provided below with reference to FIG. 2 and FIG. 3.

Deploying Configurations on Computing Devices and Validating Compliance with the Configurations During Scheduled Intervals Processes for deploying configurations on computing devices and validating compliance with the configurations during scheduled intervals are shown in FIG. 2 through FIG. 3.

Determining Sets of Configurations to Associate with Groups of Computing Devices A process for determining sets of configurations to associate with groups of computing devices is shown in FIG. 2.

The management platform 110 generates and stores configurations (step 201). Configurations may be defined by preset parameters or adjustable variable parameters that control behaviors of computing devices. For each configuration, a description of the behavior controlled by the parameters of that configuration may be stored for later viewing and optional selection by an operator of an administrator device 122.

In some embodiments, for each configuration, the management platform 110 stores computer code (e.g., modules) that can be executed by a local agent of a computing device to implement that configuration (e.g., by setting parameters on the computing device that achieve particular behaviors of the configuration). In one embodiment, the code for a configuration is generated manually by a user, and then stored in association with stored information about that configuration (e.g., details about the configuration, including any description and parameters for carrying out the configuration). An identifier of the configuration may be used to make the association.

Optionally, collections of configurations that comply with particular compliance security standards (e.g., CIS, FedRamp, HIPAA, HiTrust, ISO, NIST, DISA, STIG, or others) can be determined.

Determining a configuration or a collection of configurations can be a manual process performed by someone who generates configurations or creates collections of configurations by evaluating a benchmark of standards published by various agencies (CIS, NIST, DISA STIG, etc) and creates sets of configuration(s) that are needed to meet the benchmark.

Different possible configurations are provided in the "Configurations" section near the end of this disclosure. By way of illustration, a configuration may include parameters that specify: a Wi-Fi status indicator must be placed on a menu bar of an operating system's graphical user interface; a firewall is enabled; a screen saving must be activated within a defined period of time after inactivity (e.g., 5 minutes); passwords used to access the computing device must have particular characteristics (e.g., minimum length, may use particular types of characters, cannot use particular types of characters); only a defined number of login attempts are permitted; and any other possible settings to a computing device.

Configurations can also provide blacklisting functions, where applications or processes are selectable by name, identifier, path or code signature, and those applications or processes are terminated upon launch of a computing device on which the configurations are implemented. A UI window for providing details of the blacklisting policy to a user of the computing device can also be activated, which can include a custom configured message and/or button for opening a URL.

After different configurations are determined and stored, the management platform 110 generates an interface (e.g., a web-portal) that allows different administrator devices of different network platforms to determine (e.g., select) one or more sets of configurations that will respectively be applied to one or more different groups of computing devices (step 203). The interface is provided by the management platform 110 to the administrator device 122 of the network platform 120 (step 205).

Using the interface, an operator of the administrator device 122 selects a set of configurations (step 207). Selection of a particular configuration may be carried out by way of providing an input that identifies desired use of the configuration—e.g., selecting an option to activate the configuration, such as keeping a toggle at an "on" state or moving a toggle to an "on" state. Deselection of a particular configuration may be carried out by way of providing an input that identifies use of the configuration is not desired—e.g., selecting an option to deactivate the configuration, such as keeping a toggle at an "off" state or moving a toggle to an "off" state. While selecting configurations to include in a set, certain selected configurations may require initialization of or allow for adjustment to variables of those configurations (e.g., lengths of time associated with functionality of the configurations, or other options affecting how configurations run on computing devices).

In one embodiment of step 207, the operator of the administrator device 122 is presented with a predefined collection of configurations, and selects particular configurations by keeping a toggle at an "on" state for those configurations of the predefined collection, and moving a toggle to an "off" state for non-selected configurations of the predefined collection. Predefined collections may come in different forms, including collections of suggested configurations for complying with different compliance security standards, and the operator can select a particular collection for a particular standard from among other collections for other standards via a display presented by the web portal.

In another embodiment of step 207, the operator of the administrator device 122 selects a previously created set of configurations, and then edits that set by adding or removing configurations from the set, or by modifying values of adjustable variables for particular configurations before saving an updated version that set that includes the modifications.

In other embodiments of step 207, the operator of the administrator device 122 may select configurations using other approaches—e.g., searching for particular configurations.

Through the web-portal, selections of configurations and any values of initialized or modified variables for particular configurations are transmitted from the administrator device 122 to the management platform 110 (step 209).

The management platform 110 stores identifiers of received sets of configurations and values of variables (step 211). Any user-created code may also be stored. In one embodiment, identifiers of selected configurations and any values of variables are stored by the management platform 110 to represent the set. In another embodiment, the actual configurations are stored as a set. However, storage of identifiers is more efficient in terms of minimizing use of limited storage capacity at the management platform 110. A name of the set may also be defined by the operator of the administrator device 122 and stored along with the set.

The management platform 110 generates an interface (e.g., web-portal) that allows the administrator device 122 of the network platform 120 to determine groups of computing devices to which a set of configurations will apply (step 213). The interface is provided by the management platform 110 to the administrator device 122 of the network platform 120 (step 215).

Using the interface, an operator of the administrator device 122 selects computing devices for inclusion in a group of computing devices (step 217). An existing group can be selected and modified to add or remove a computing device. Prior to step 217, different computing devices of a network platform 120 are registered with the management platform 110 so they can be selected by the operator of the administrator device 122 of that network platform 120 (e.g., selected by device name or another unique identifier). Registration can be carried out in different ways.

In one embodiment, an installer with an agent that is associated with the network platform 120 is installed on computing devices of that network platform 120. A package generation script is used by the management platform 110, which generates and sends a request to build a new package with configuration options that identify where to store the installer file (e.g., a directory owned by the company of a network platform 120) and a unique key that is later used to identify and register a computing device that receives the installer. Installation of the agent associates a computing device with the network platform 120, and the agent transmits a unique identifier from the computing device (e.g., name of the computing device, serial number, UUID, other) to the management platform 110. That unique identifier can be selected by the operator of the administrator device 122 and added to a group of computing devices to which a set of configurations will apply. The agent may be a unique agent for the purpose of registering a computing device. Alternatively, the agent may be the same local agent of steps 223-227, such that steps 223-227 occur before steps 213-221 and optionally before steps 203-211.

In another embodiment, steps 213-221 are not performed, and the operator of the administrator device 122 selects an option to create the installer of step 223, and then identifies individual computing devices to which that installer is transmitted. During the installation process of step 227, a unique identifier is transmitted for the computing device (e.g., name of the device, serial number, UUID, other) to the management platform 110 to register the computing device in association with a network platform 120 of the administrator device 122.

During registration, in some embodiments, other information associated with a computing device is collected, including users of the device, processors, RAM, hard drives, boot information, device information, and/or OS version. When collected, this information is stored in association with the unique identifier of the computing device. All unique identifiers of computing devices of a network platform 120 have a stored association with an identifier of that network platform 120.

Through the web-portal, selections of computing devices to include in a group are transmitted from the administrator device 122 to the management platform 110 (step 219).

The management platform 110 stores the group of selected computing devices (step 221)—e.g., by storing the unique identifiers of the selected computing devices in association with the selected set of configurations.

In different embodiments, steps 213 through 221 can be performed before or after steps 203 through 211. In one embodiment, an option to select a group of computing devices to associate with a set of configurations is provided via the web-portal—e.g., the operator of the administrator device 122 is provided with an option to "view all" computing devices and/or all preset groups of computing devices of the network platform 120, and then select from the list.

After a group of computing devices has been determined and associated with a set of configurations, the management platform 110 generates an installer for each computing device of a group (step 223). The installer includes an executable file that is configured to install a local agent on the computing device for which the custom installer has been created. In some embodiments (discussed previously), this step is performed prior to steps 213-221 and optionally steps 203-211 (i.e., when a computing device joins the network platform 120, or when the network platform 120 initially engages with the management platform 110).

Each installer for each computing device of the group is transmitted from the management platform 110 to the particular computing device 124 (step 225). Alternatively, an installer may be provided by the management platform 110 to the administrator device 122, and the administrator device 122 provides the installer to selected computing devices 124. Transmission of the installer can be manually driven by a user of the computing device 124 or the operator of the administrator device 122.

After downloading the installer, the particular computing device 124 runs the installer to install a local agent (step 227) that is used to carry out a process shown in FIG. 3 for implementing a set of configurations on the computing device 124 and for validating the computing device's compliance with the configurations during scheduled intervals. The local agent includes different executable modules for different possible configurations, and different logical instructions for implementing a configuration based on different operating systems and versions of operating systems, such that a first set of logical instructions for implementing a particular configuration will be selected by the local agent running on a first computing device with a first operating system (or a first version of an operating system), and a second set of logical instructions for implementing the particular configuration will be selected by the local agent running on a second computing device with a second operating system (or a second version of the operating system). In one embodiment, the same local agent and executable modules are installed on every computing device of the selected group of computing devices, and the executable modules include modules for a superset of possible configurations that may include more configurations than are selected for the group of computing devices. In another embodiment, the same local agent and executable modules are installed on every computing device from two or more groups of computing devices (e.g. from the same network platform or different network platforms), and the executable modules include modules for a superset of possible configurations that may include more configurations than are selected for each of the groups.

In an alternative embodiment, another step before step 223 is performed, where a user of a computing device receives notification that the computing device has been assigned to a set of configurations, after which the user then initiates a download of a specific installer (alternative step 223) that includes a local agent with modules for the set of configurations assigned to that computing device. The local agent need not include modules for implementing a superset of configurations. Instead, only modules for implementing configurations of the set assigned to the computing device is included. If new configurations are added to the set, then modules for implementing those new configurations are sent to the computing device. In one embodiment, each computing device of a group receives modules with only the logical instructions needed for implementing configurations based on the operating system and/or version of operating system of that computing device, and without logical instructions for implementing configurations based on other operating systems and/or other versions of the operating system.

Implementing a Set of Configurations on a Computing Device and Validating Compliance with the Configurations During Scheduled Intervals A process for implementing a set of configurations on a computing device and validating compliance with the configurations during scheduled intervals is shown in FIG. 3. A local agent installed on a computing device 124 may be used to perform steps of this process that are carried out on the computing device 124.

The computing device 124 retrieves identifiers of current configurations assigned to that the computing device (step 329)—e.g., a set of configurations associated with a group of computing devices to which the computing device 124 belongs. During step 329, the local agent installed on the computing device 124 generates a request that contains information used by the management platform 110 to locate and retrieve identifiers of configurations for the set of configurations assigned to the computing device 124. The information may take different forms. In one embodiment, each computing device uses a unique key to authenticate to a webapp API of the management platform 110. This computer-specific key is also used to identify which computing device is making the request, and the identity of the computing device is used to identify the configuration group to which that computing device belongs. The local agent calls a parameters API endpoint using its unique key to authenticate the request, and the management platform 110 (e.g., webapp) determines what data to send based upon the authentication. Likewise, when the local agent submits data back to the management platform 110 (e.g., webapp), the key is used to determine the device to which the data belongs.

The request for current configurations is transmitted from the computing device 124 to the management platform 110 (step 331).

After receiving the request, the management platform 110 retrieves stored identifiers of the set of configurations for the computing device 124 (step 333). The management platform 110 uses the information of the request to locate, from storage, identifiers for the current set of configurations for the computing device (e.g., for the group of computing devices in which the computing device is a member). Particular values of variables for particular configurations of the current set of configurations are also retrieved from storage where those variables are stored in association with the identifiers (e.g., nested in an object of the identifier). Values of variables can be text, integers, boolean true/false values as single items, values, lists, dictionaries, or other data. The identifiers will be returned by the management platform 110 to the local agent of the computing device 124, and the local agent can use the identifiers to select modules of associated configurations for execution using the variable values.

The retrieved identifiers of the set of configurations for the computing device 124 are transmitted (step 335). Any retrieved values of variables for the set of configurations are also transmitted from the management platform 110 to the computing device 124. In some embodiments, modules for any newly created configurations are also transmitted from the management platform 110 to the computing device 124 for installation with the local agent.

The computing device 124 stores and uses received configuration identifiers and any variable values to determine if each configuration in the set of configurations is implemented properly (step 337). In some embodiments, an initial check if a selected configuration is already implemented is made (e.g., by checking if a received value of a variable for that configuration is already set, by checking if functionality of the computing device complies with the configuration, or other approach). Instructions that perform this check may be included in each module for each configuration, or in a separate module of the local agent. In one embodiment, received parameters for identified configurations are compared to implemented parameters of the configurations to determine if there is a mismatch, and determinations are made that (i) a configuration is implemented when there is no mismatch for that configuration, or (ii) a configuration is not implemented when there is a mismatch for that configuration. In other embodiments, no check is made, and all configurations are implemented.

If the set of configurations are being implemented for the first time, then step 337 is may be skipped in some embodiments.

In some embodiments, the local agent retrieves and stores the OS version, computer model and serial number for the computing device 124 after the local agent is installed on the computing device 124. The agent uses information like OS version for selecting conditional logic and to determine compatibility with parameters of selected configurations.

The local agent of the computing device 124 attempts to implement any unimplemented configuration (step 339). Identifiers of configurations returned by the management platform 110 to the local agent of the computing device 124 are used by the local agent to select modules associated with those configurations to implement (e.g., the agent may associate identifiers with functions, chains of functions, class objects, etc.). If different logical instructions for different operating systems or versions of an operating system exist for a selected module, the local agent of the computing device 124 will access available information about the operating system and/or version of the computing device 124, and then select logical instructions for that operating system and/or version. When executing each configuration's module and any logical instructions (if they exist), any existing variable values associated with that configuration are used to set functionality of the computing device 124 so it complies with the configuration. As mentioned with optional step 337, an initial check to determine if a selected configuration is already implemented can be performed in some embodiments. If the configuration is not yet implemented, then instructions from the module for that configuration are executed to implement the configuration on the computing device 124. After implementations of configurations, a restart of the computing device 124 is performed if needed. In some cases, configurations are able to use native frameworks directly without needing to touch anything in a filesystem of the computing device 124.

Although not shown in FIG. 3, some embodiments monitor filesystem events on the computing device 124 using the local agent, which checks all of the files for the local agent against a database of known-good checksums to determine if any local agent files are missing (e.g., have been moved or deleted) or modified. If there is a mismatch (e.g., a file is missing or modified), the local agent downloads and reinstalls the missing or modified files to restore them to their intended state. The process of monitoring filesystem events may occur at different times, including before step 329 or any time thereafter. A missing or modified file may be downloaded when the local agent generates a request for a file containing the module, sends the request to the management platform 110, receives the requested file from the management platform 110, and downloads the received file. Alternatively, backup files may be stored on the computing device 124 (e.g., in case the computing device 124 goes offline or another reason), and the file may be retrieved from the backup files.

The local agent of the computing device 124 generates data specifying the statuses of configurations on the computing device 124 (step 341)—e.g., for each configuration, a status indicating whether that configuration is implemented or not. Optionally, the local agent may provide alerts about unimplemented statuses of configurations and prompt the user to implement the configurations when automatic implementation is not possible. Actions by users of computing devices can also be logged and transmitted to the management platform 110—e.g., user attempts to use a blacklisted application or program, user attempts to remove required configurations, or user attempts to modify required parameters of configurations.

By way of example, statuses may include: implemented; remediated (e.g., implemented after being not implemented); not implemented (error—e.g., no ability to apply the configuration to the computing device 124); not implemented (alert for user intervention—e.g., alert to manually implement the configuration was provided or scheduled to be provided to a user of the computing device 124). The local agent may, in some embodiments, collect other information about the computing device 124, such as connected hard drives, installed applications, configuration profiles and user accounts (e.g., determined from a property list file on the computing device 124 if available).

The local agent of the computing device 124 returns to step 329 at regularly scheduled intervals (e.g., every 15 minutes), or after the computing device 124 is powered on (step 343). In one embodiment, the operator of the administrator device 122 is permitted to set the duration of the scheduled intervals via the web-portal, and the duration is stored for later retrieval by the local agent or is coded into the local agent.

Repeating steps 329 through 341 on a regular basis permits deployment of updates to the set of configurations, and/or ensures a computing device continually complies with the set of configurations over time under circumstances when the set of configurations remains unchanged over time or evolves over time. If the local agent is unable to retrieve configurations during steps 329 through 335, which may occur when the computing device 124 is offline or otherwise unable to connect to the management platform 110, then steps 337 through 343 are performed for the most recently retrieved configurations.

The statuses of configurations on the computing device 124 are transmitted to the management platform 110 (step 345). If the local agent is unable to transmit the statuses due to the computing device 124 being offline or otherwise unable to connect to the management platform 110, transmission occurs after the computing device 124 can connect to the management platform 110.

The management platform 110 stores the statuses in the data source 111, and then generates a report along with any alerts for viewing by the administrator device 122 via a web portal (step 347). Generated reports along with any alerts are transmitted to the administrator device 122 (step 349), and an operator of the administrator device 122 views the reports and any alerts (step 351). Reports may include different details, including: an overall status for a computing device (e.g., all configurations implemented, some configurations not implemented); a status for individual configurations, including compliant and non-compliant statuses for particular computing devices; historical statuses for computing devices; indicators that a previously non-compliant status for a configuration was remediated to a compliant status for that configuration; or other desired features.

At any time (e.g., before or after any step of FIG. 3), an operator of the administrator device 122 can modify a set of configurations, and/or modify a group of computing devices associated with a set of configurations (step 361). Modification of a set of configurations may be by removing or adding a configuration, or by modifying values of variables for a configuration. Modification of a group of computing devices may be by removing or adding a computing device. Of course, sets of configurations and/or groups of computing devices can be deleted, and groups of computing devices or individual computing devices can be re-associated with other sets of configurations. Any modifications made by the operator are transmitted to the management platform 110 for storage (step 363), and the management platform 110 updates stored set of configurations and/or groups of computing devices to reflect the modifications (step 365).

The local agent of the computing device 124 may optionally interact with the user of the computing device 124 in different ways, including: displaying an icon on the menu bar to indicate the local agent is installed and functioning; prompting the user to take action (e.g., to implement a configuration); requesting submission of diagnostic data for troubleshooting; or other interactions.

The steps for the computing device shown in FIG. 2 and FIG. 3 are repeated for different computing devices in groups of computing devices that are associated different sets of configurations. The steps for the administrator device shown in FIG. 2 and FIG. 3 are repeated for different administrator devices of different network platforms.

User Interfaces

Different user interfaces for different functionalities related to deploying configurations on computing devices and validating compliance with the configurations are illustrated in FIG. 4A through FIG. 4M.

Figure 4A:
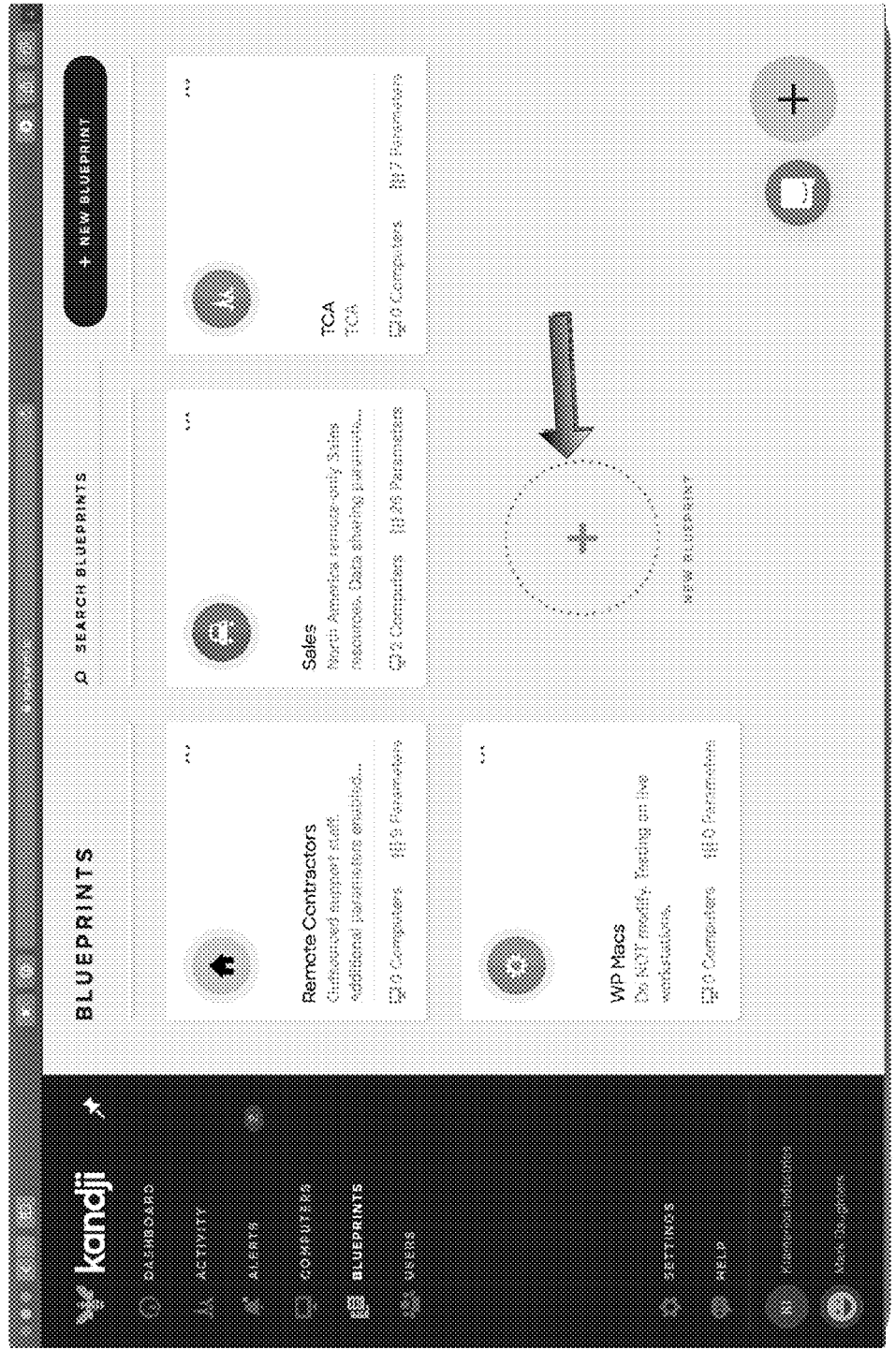
Figure 4B:
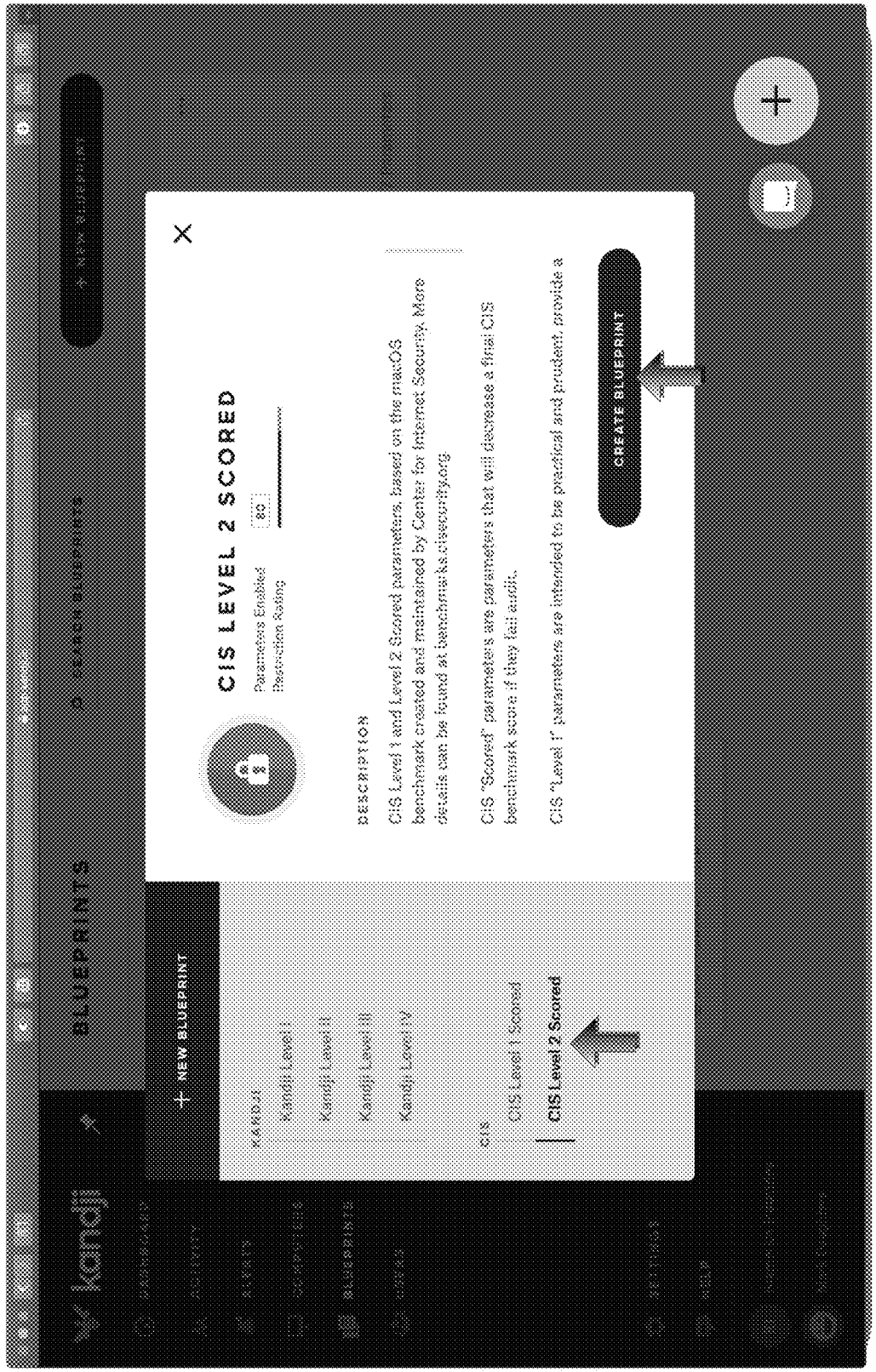
Figure 4C:
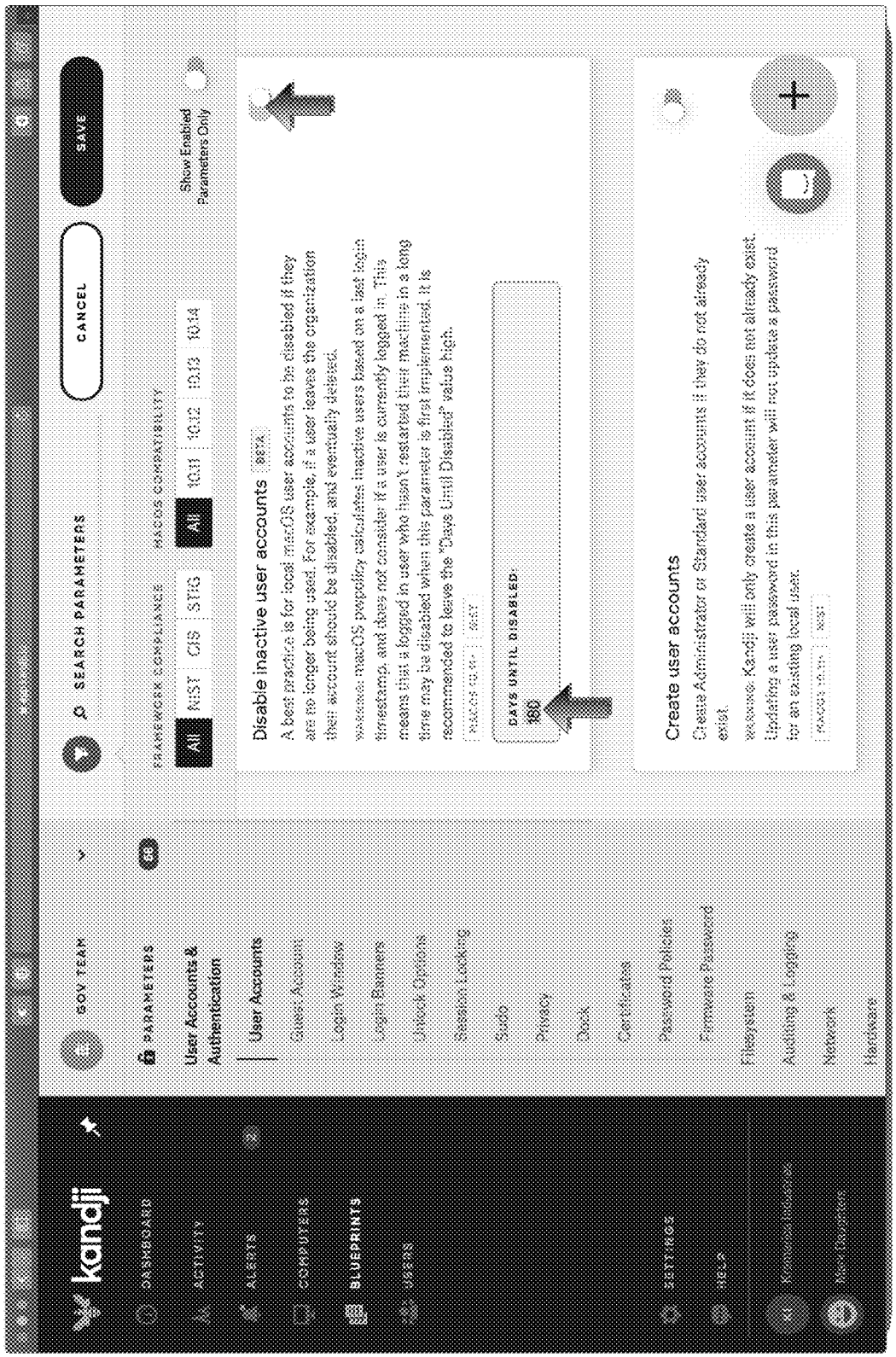
Figure 4D:
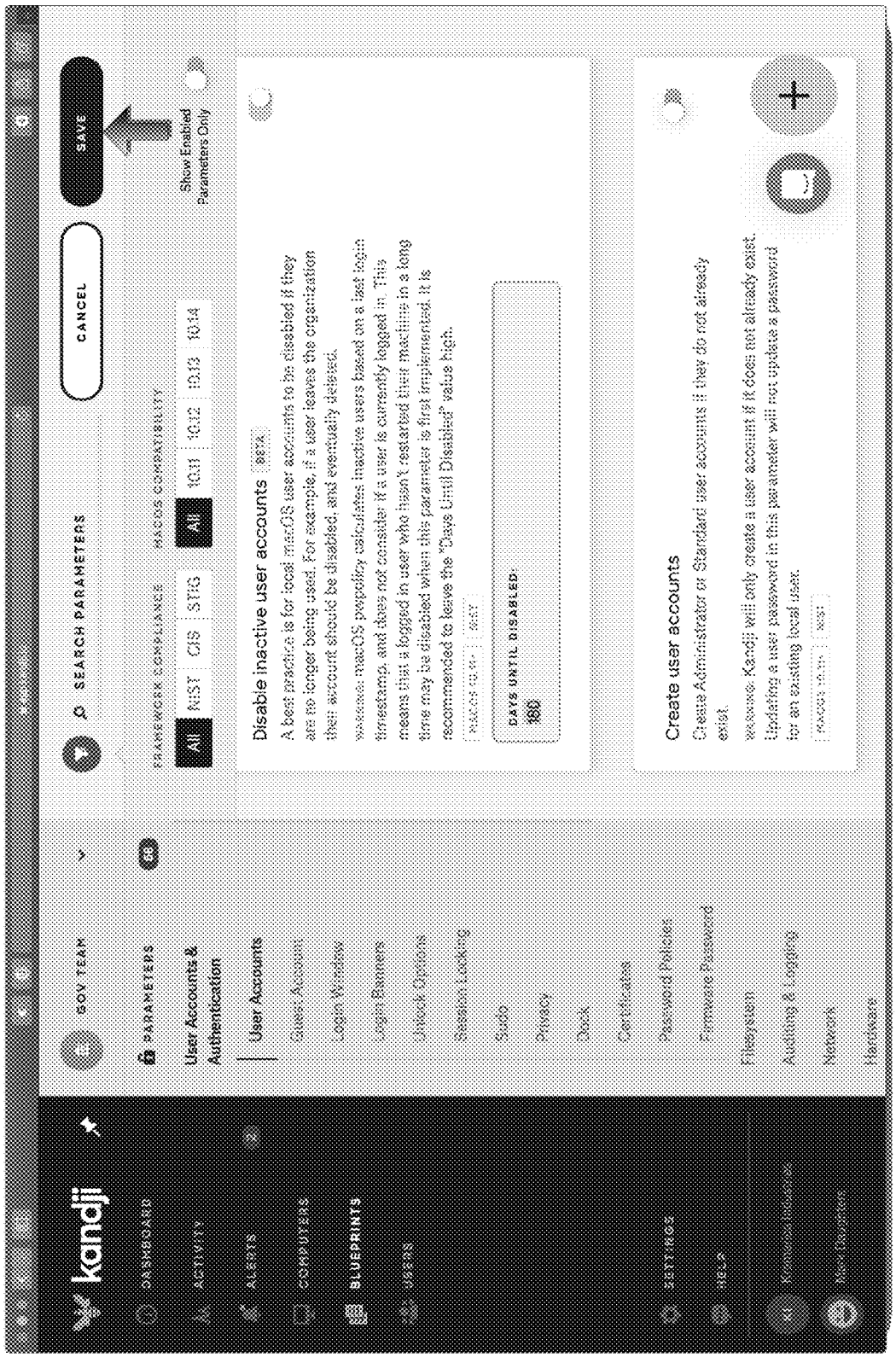

Steps of a process for creating a set of configurations can be at least partially carried out using the user interfaces shown in FIG. 4A through FIG. 4D. As shown, FIG. 4A depicts an interface for selecting an option to create new set of configurations. FIG. 4B depicts an interface for optionally selecting a collection of configurations that are based on a security standard. FIG. 4C depicts an interface for selecting configurations from the collection by activating configurations and setting parameters (adjustable variables) of those configurations. FIG. 4D depicts an interface for saving a selected set of configurations.

Figure 4E:
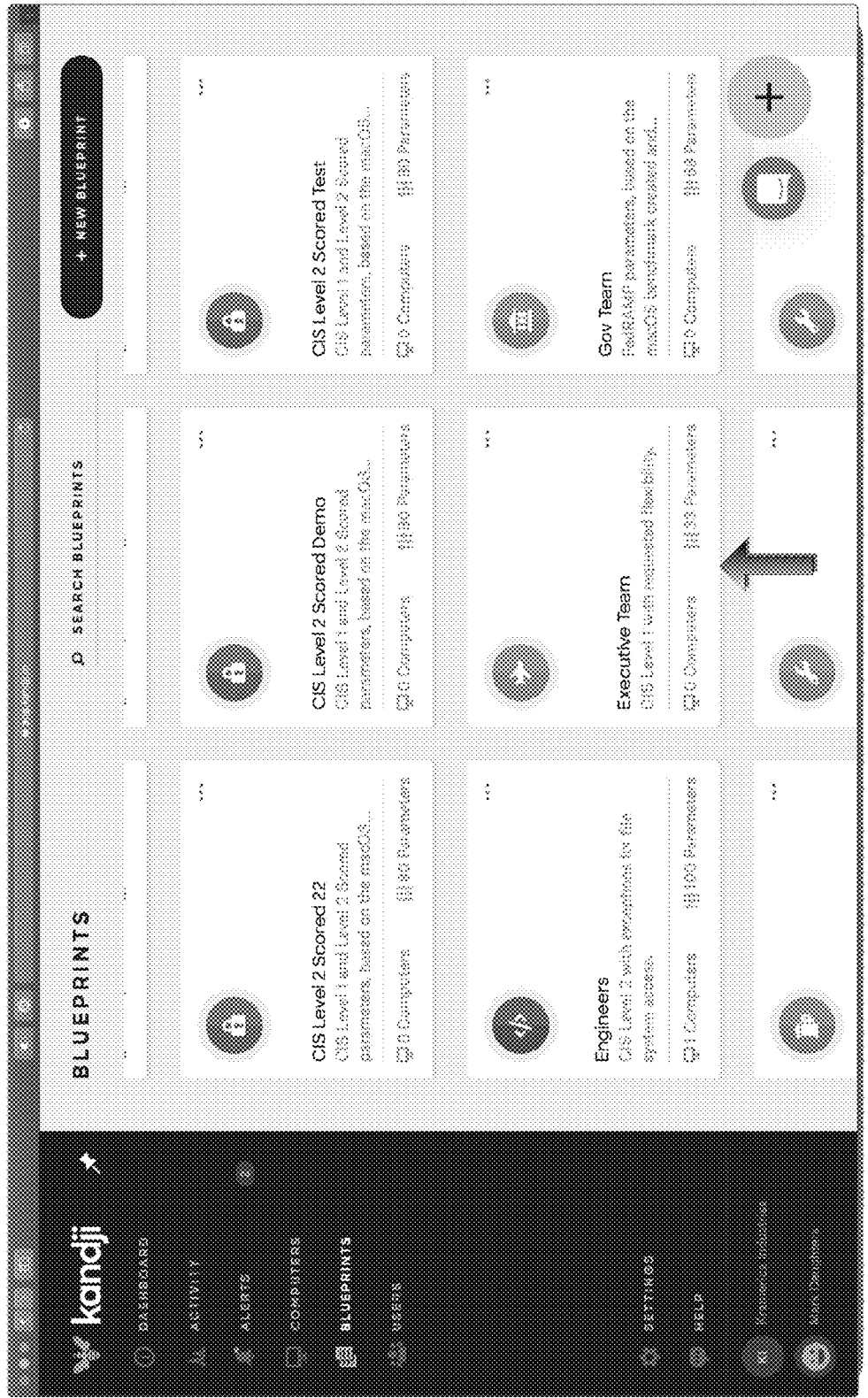
Figure 4F:
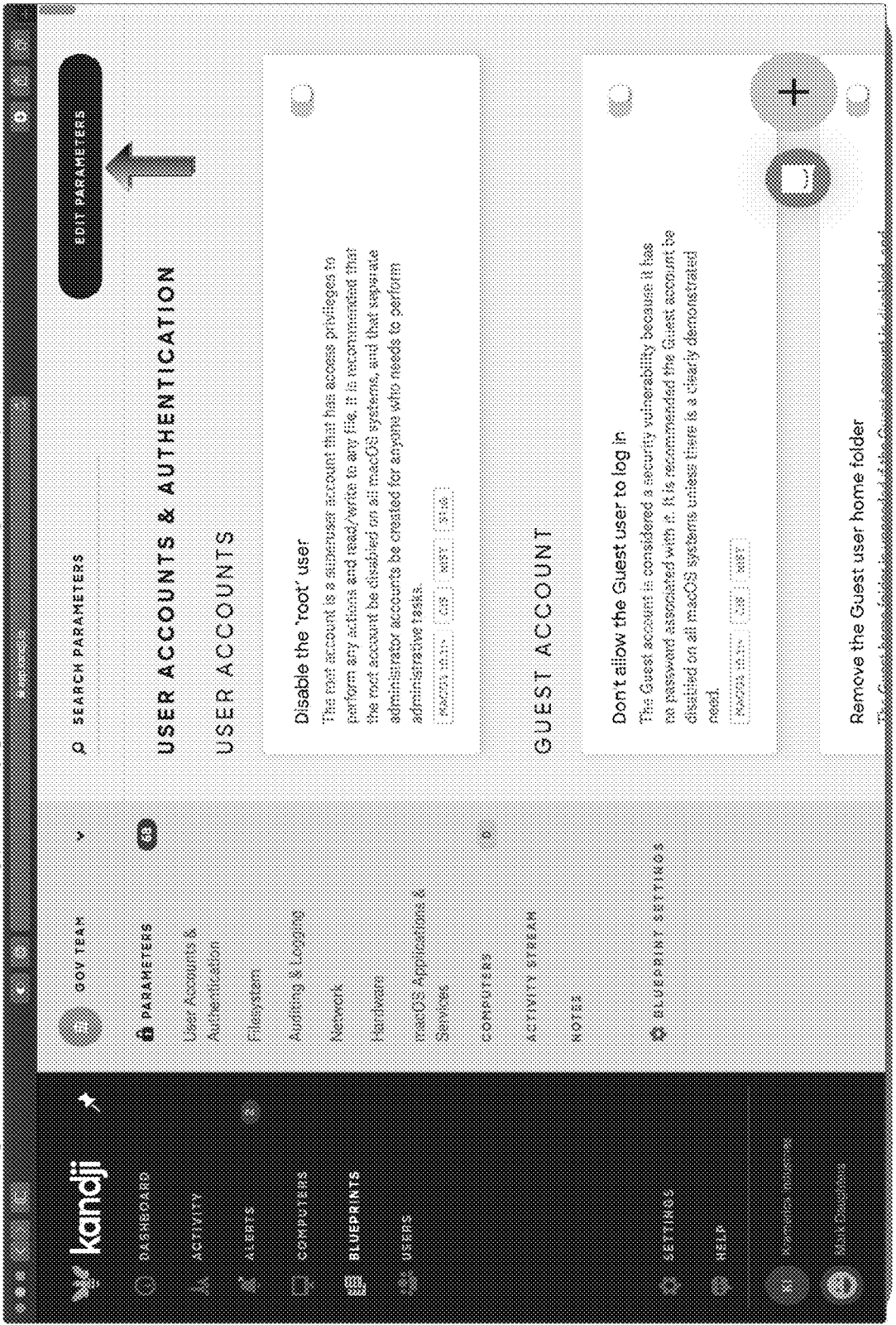
Figure 4G:
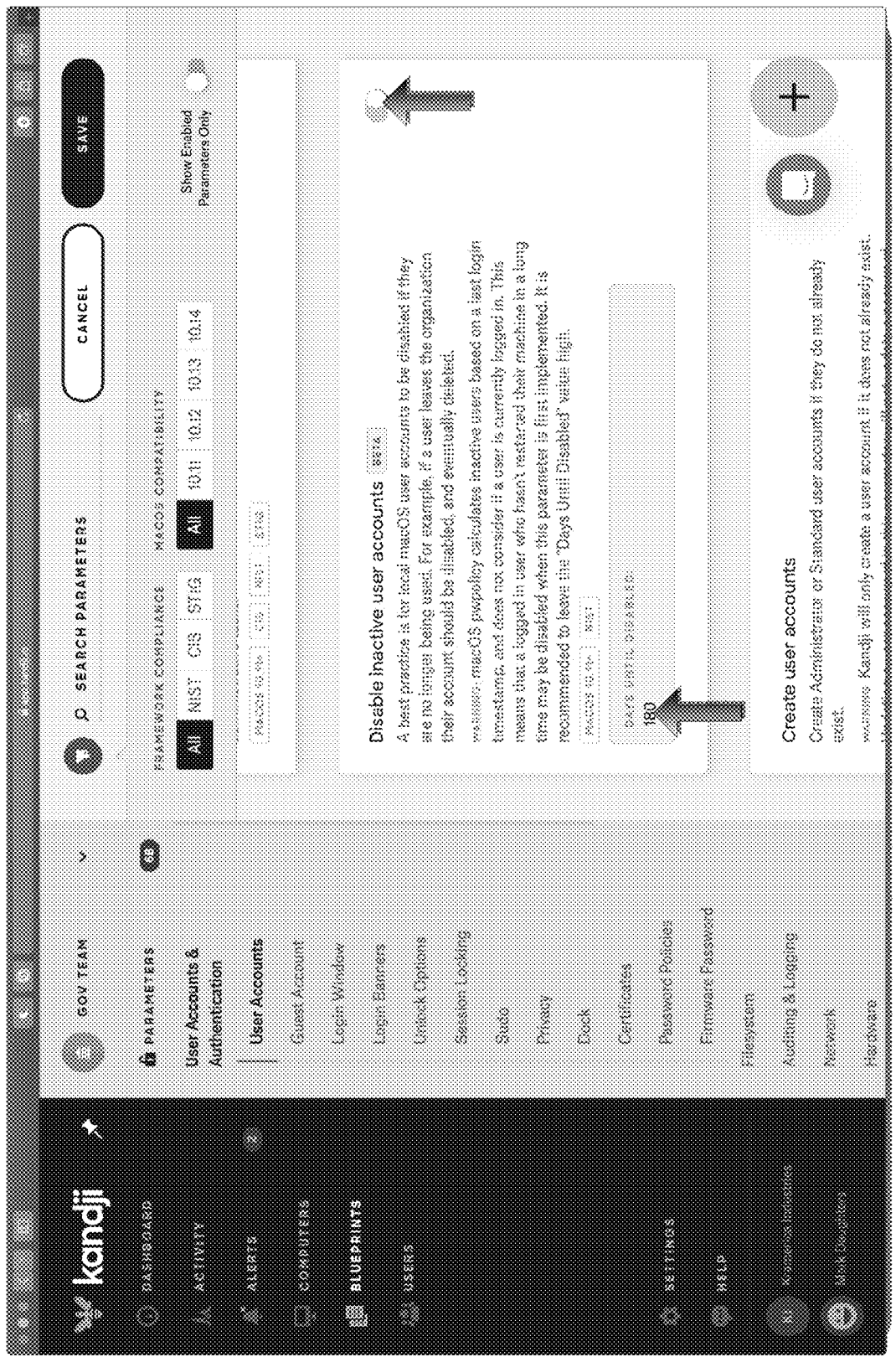
Figure 4H:
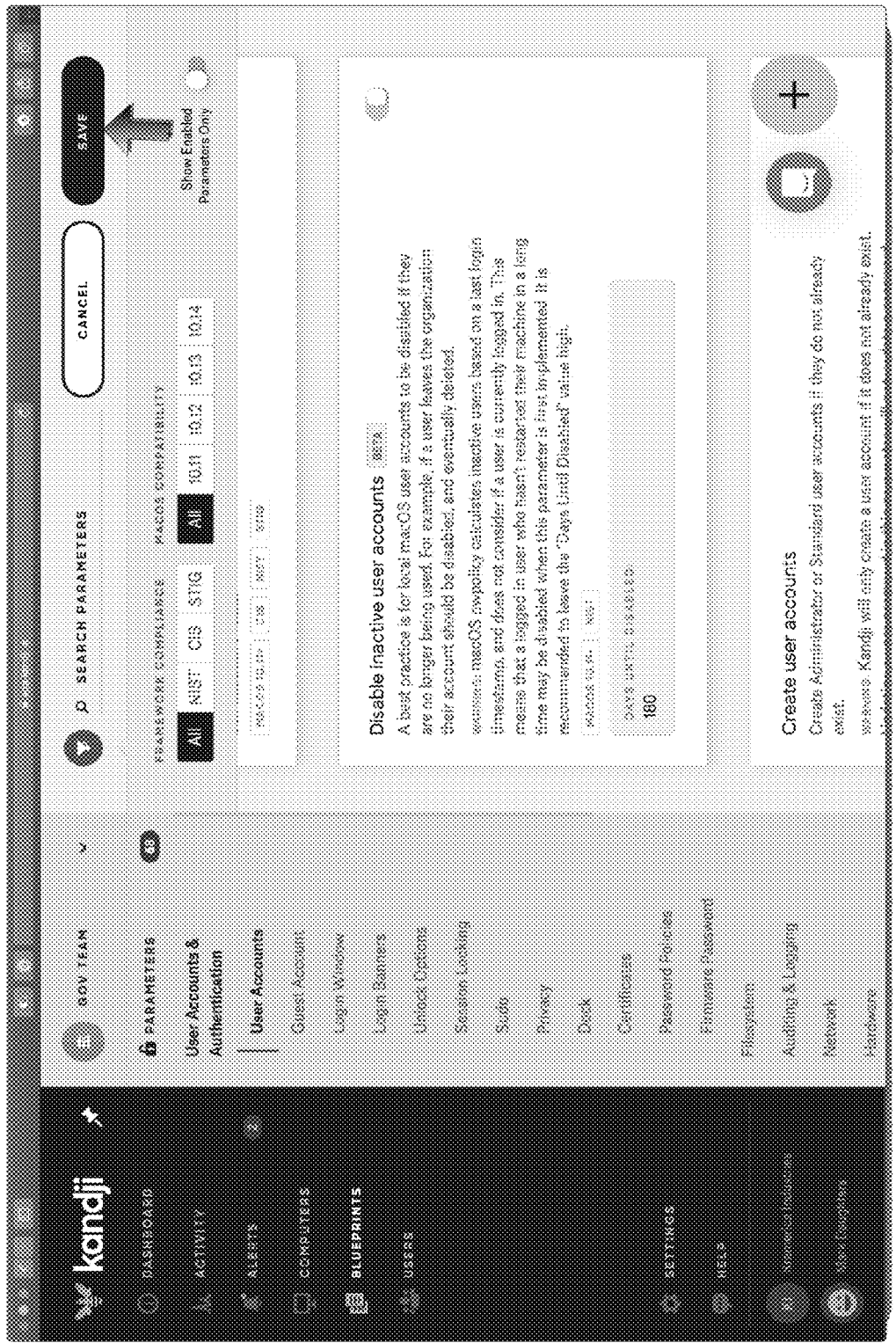

Steps of a process for editing previously generated sets of configurations can be at least partially carried out using the user interfaces shown in FIG. 4E through FIG. 4H. As shown, FIG. 4E depicts an interface for selecting a set of configurations to edit. FIG. 4F depicts an interface for selecting an option to edit. FIG. 4G depicts an interface for enabling or disabling configurations of the set, and for editing parameters of particular configurations. FIG. 4H depicts an interface for saving edits.

Figure 4I:
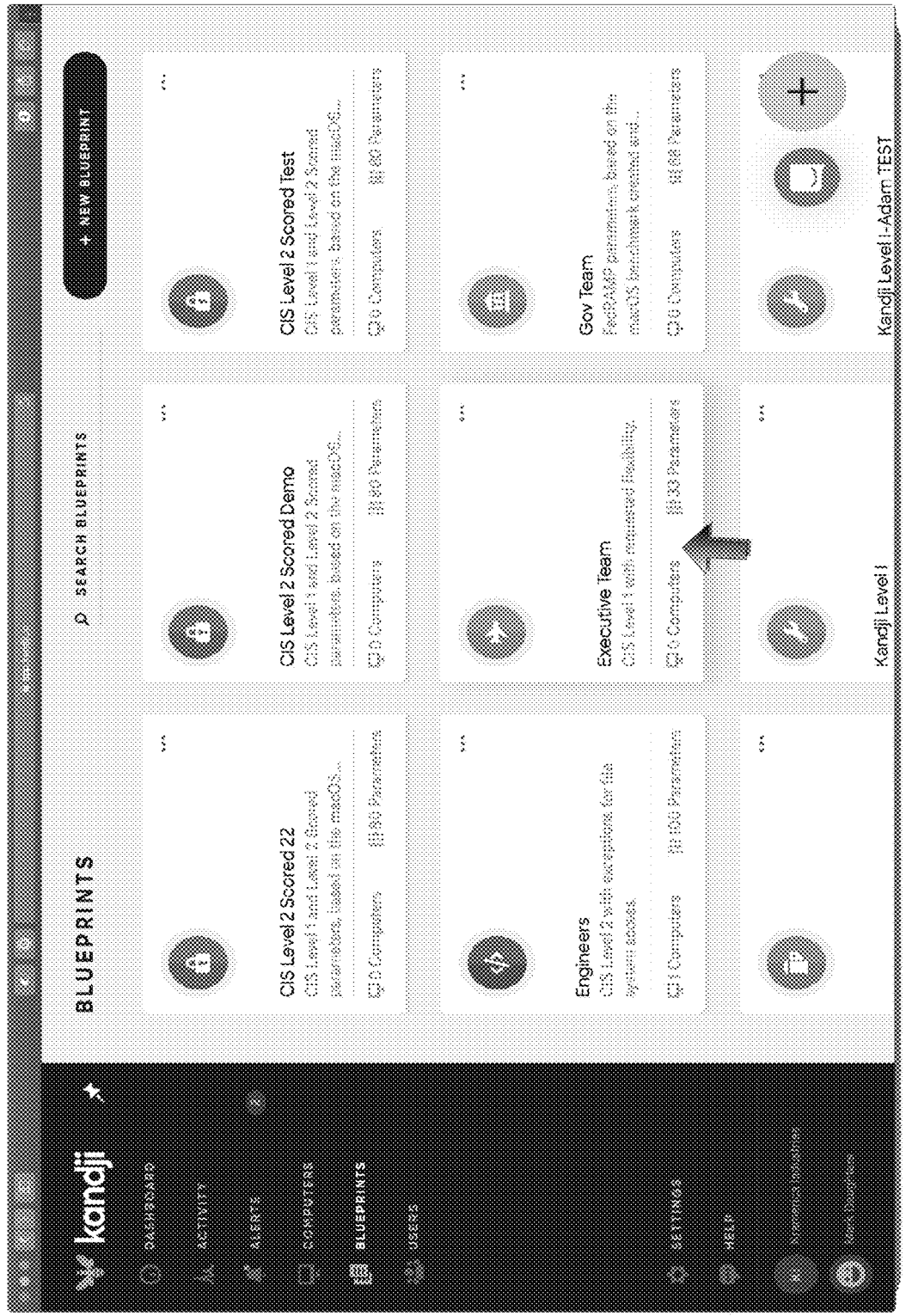
Figure 4J:
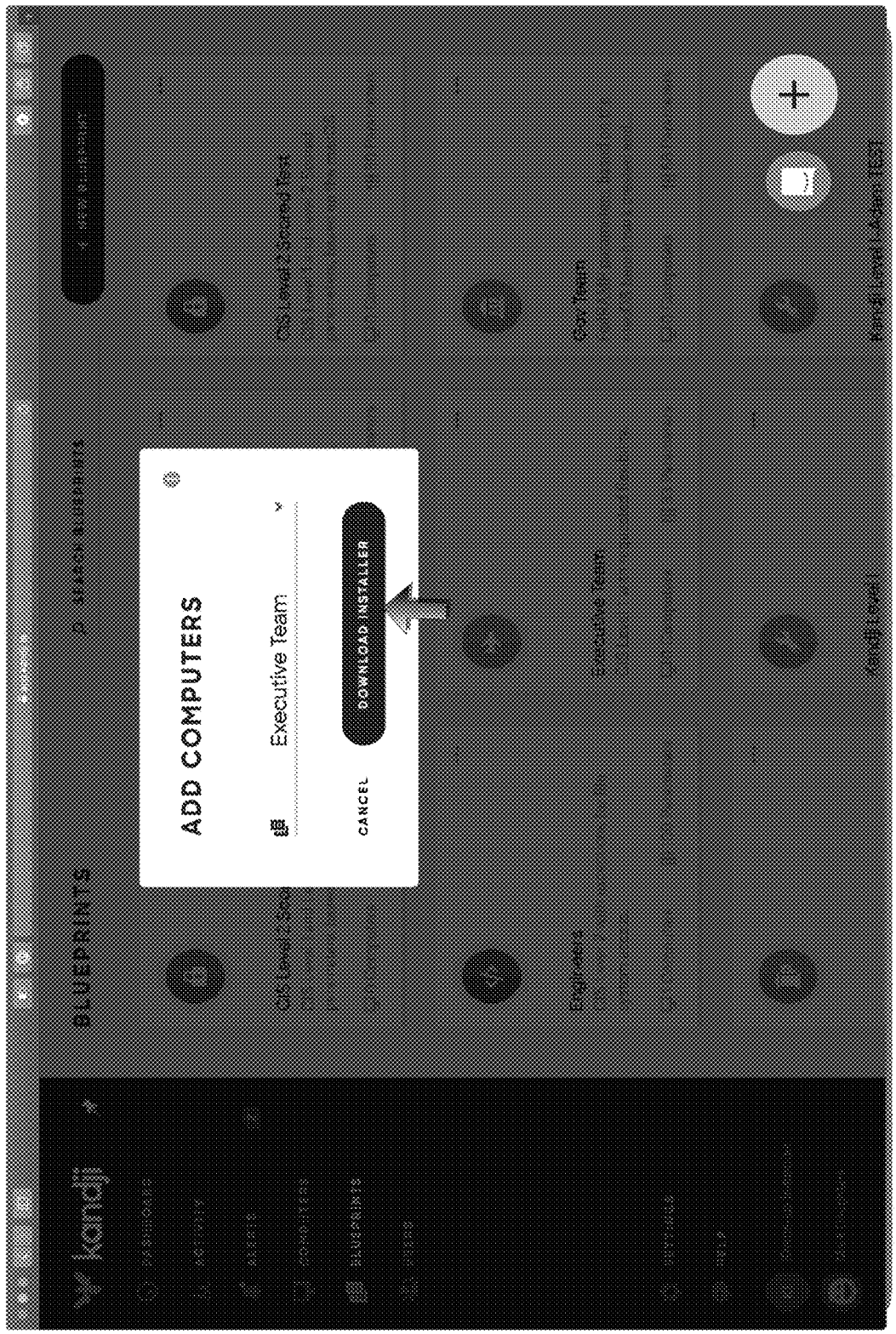

Steps of a process for enrolling groups of computing devices can be at least partially carried out using the user interfaces shown in FIG. 4I through FIG. 4J. As shown, FIG. 4I depicts an interface for selecting a set of configurations, which may indicate a pre-existing association with a group of computing devices ("executive team"). FIG. 4J depicts an interface for selecting an option to enroll the group associated with the set of configurations.

Figure 4L:
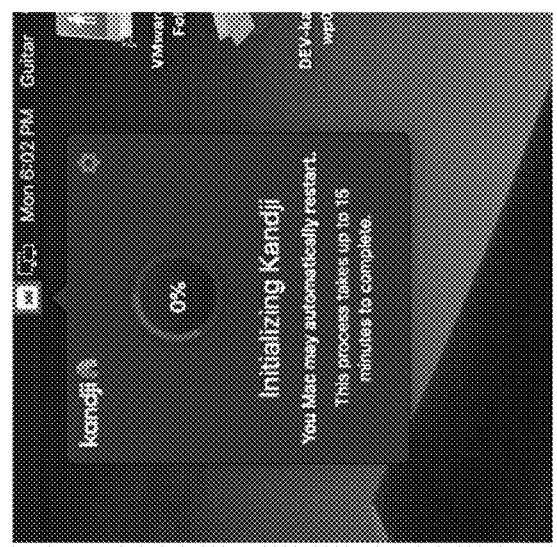
Figure 4K:
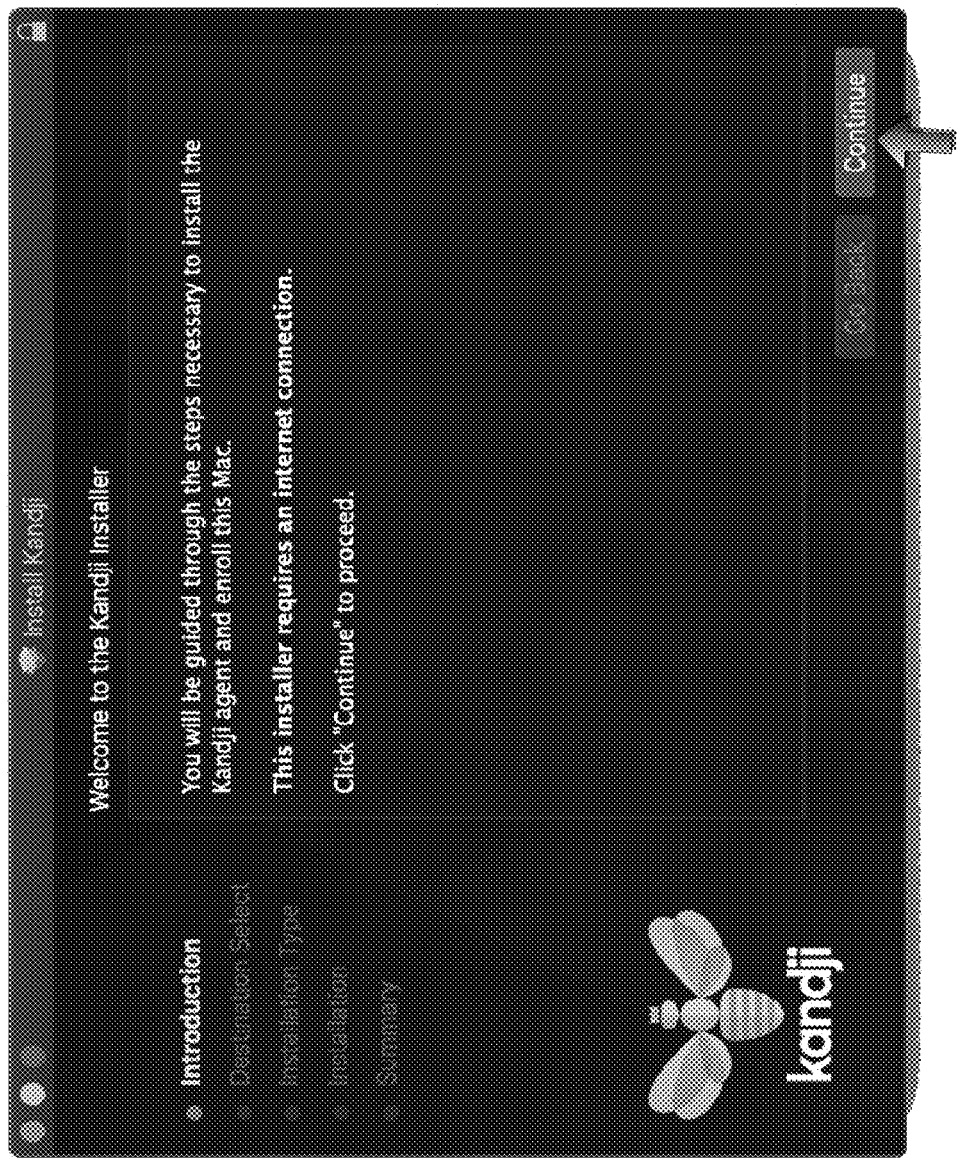

Steps of a process for providing interface on a particular computing device for downloading a custom installer after enrollment of that computing device can be at least partially carried out using the user interfaces shown in FIG. 4K through FIG. 4L.

Figure 4M:
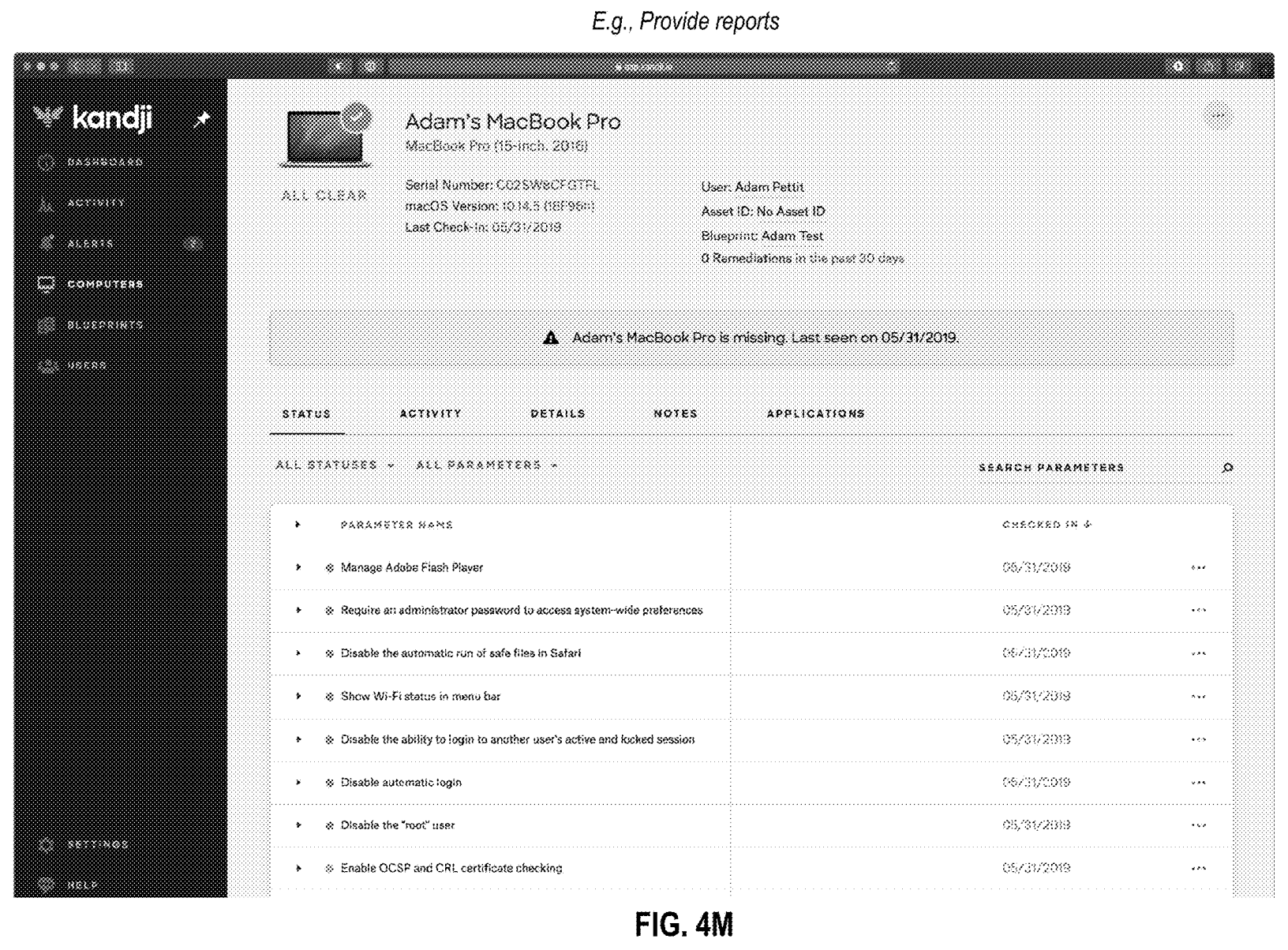

Steps of a process for providing reports to an administrator can be at least partially carried out using the user interface shown in FIG. 4M Configurations By way of example, a non-exhaustive list of configurations and variables for specification by an administrator (if applicable) include: Disable the "root" user; Disable inactive user accounts [variable(s): specify days until disabled]; Create user accounts [variable(s): specify one or more account names, home folder name, user type, and password]; Demote user accounts to Standard [variable(s): specify any usernames to exclude from being demoted]; Don't allow the Guest user to log in; Remove the Guest user home folder; Don't allow guests to connect to shared folders; Disable automatic login; Display login window as name and password; Disable and remove password hints; Disable fast user switching menu; Disable console login; Enforce a custom message for the lock screen [variable(s): specify message text]; Enforce a custom policy banner [variable(s): specify banner type and contents]; Set a CLI login banner [variable(s): specify login banner message text]; Disable the ability to login to another user's active and locked session; Disallow unlock with Apple Watch; Disallow unlock with Touch ID; Lock screen after Screen Saver or sleep begins [variable(s): specify minutes of delay to lock after sleep or screen saver begins]; Manage Screen Saver [variable(s): specify minutes of delay to start screen saver]; Ensure at least one Hot Corner is set to start Screen Saver or put the display to sleep [variable(s): specify action and location of hot corner]; Ensure no Hot Corner is set to disable Screen Saver; Ensure display sleep interval is greater than Screen Saver interval; Log out inactive users [variable(s): specify delay in minutes before users are logged out]; Reduce sudo timeout period to 0; Use a separate timestamp for each user/tty combo; Manage Location Services [variable(s): specify if location services is enabled or disabled]; Monitor Location Services; Disallow sending diagnostic and usage data to Apple; Manage Dock auto-hiding [variable(s): specify if dock auto-hiding should be enabled or disabled]; Enable OCSP and CRL certificate checking; Disallow simple passwords; Maximum failed login attempts [variable(s): specify how many failed attempts will lock the account]; Account lockout duration [variable(s): specify the number of minutes that an account will remain locked if locked due to failed login attempts]; Minimum number of complex characters [variable(s): specify minimum number of complex characters that can be used in passwords]; Minimum password length [variable(s): specify minimum character length of passwords]; Require alphanumeric password; Maximum allowed password age [variable(s): specify amount of days that can pass before the user is asked to change password again]; Password history [variable(s): specify amount of prior passwords that will be rejected during a password change]; Force user to reset password at next authentication; Advanced Password Management [variable(s): specify minimum length, numeric characters, symbolic characters, minimum symbolic characters, allowed repeating characters, allowed sequential characters, minimum uppercase letters, minimum lowercase letters, maximum failed logins, account lockout duration, days of inactivity before account is disabled, if password change should be forced at next authentication after deployment of parameter, amount of rejected prior passwords, maximum password age]; Set a Firmware Password [variable(s): specify the firmware password to be deployed]; Show all filename extensions in Finder; Manage the display of hidden files in Finder [variable(s): specify if hidden files should be shown or hidden]; Enable FileVault 2 [variable(s): specify if recovery key is presented to users when enabling filevault]; Escrow FileVault Recovery Keys to management platform; Report user accounts with FileVault Recovery Keys escrowed to iCloud; Report encryption status of attached APFS and CoreStorage volumes; Enable System Integrity Protection (SIP); Check Applications folder for appropriate permissions; Check Library folder for world writable files [variable(s): specify directories that should be excluded from having permissions checked and adjusted]; Check System folder for world writable files; Secure home folders; Set umask for all users; Disable Spotlight Suggestions; Prevent Spotlight from searching specified directories [variable(s): specify directories that should be excluded from spotlight searches]; Enable security auditing; Set security auditing flags [variable(s): specify prefix and flag for audits]; Set retention for security auditing [variable(s): specify days and/or file size that logs will be retained for]; Set security auditing maximum log file size [variable(s): specify maximum size a single file can become before a new file is created]; Secure access to audit records; Ensure Firewall is configured to log; Set retention for system.log [variable(s): specify amount of days system]; log should be retailed for]; Set retention for appfirewall.log [variable(s): specify amount of days appfirewall]; log should be retained for]; Set retention for authd.log [variable(s): specify amount of days authd]; log should be retained for]; Set retention for install.log [variable(s): specify amount of days install]; log should be retained for]; Ensure date and time is set automatically [variable(s): specify time server URL]; Restrict NTP server to loopback interface; Ensure time is within appropriate limits; Enable Firewall; Enable stealth mode; Block all incoming connections; Manage number of allowed firewall rules [variable(s): specify the maximum allowed number of firewall rules]; Enable detailed logging; Manage Screen Sharing [variable(s): specify if screensharing should be disabled or enabled]; Disable File Sharing; Disable Printer Sharing; Disable Remote Login; Disable Remote Management; Disable Remote Apple Events; Disable Internet Sharing; Disable Bluetooth Sharing; Disable Content Caching; Disallow iCloud Reminders; Disallow iCloud Bookmarks; Disallow iCloud Notes; Disallow iCloud Keychain Sync; Disallow Find My Mac; Disable waking for network access; Disable sleeping when connected to power; Set hibernate (standbydelay) [variable(s): specify minutes of delay before standby starts]; Disable Siri; Disable System Preferences panes [variable(s): specify which of the following system preference panes are disabled on devices: general, dock, language & region, spotlight, displays, keyboard, trackpad, sound, icloud, wallet & Apple Pay, Network, Extensions, Touch ID, Parental controls, Date & Time, Accessibility, Ink, Desktop & Screen Saver, Mission Control, Security & Privacy, Notifications, Energy Saver, Mouse, Printers & Scanners, Startup Disk, Internet Accounts, App Store, Bluetooth, Sharing, Users & Groups, Siri, Time Machine, Profiles, CDs & DVDs]; Require an administrator password to access system-wide preferences; Monitor Time Machine status [variable(s): specify how many days are allowed before an alert is triggered]; Monitor encryption status of Time Machine volumes; Disable Handoff; Disallow password proximity requests; Manage Adobe Flash Player [variable(s): specify if Adobe Flash is set to automatically update or disabled and removed if found on devices]; Disable Java 6 from being the default Java runtime; Watchman Monitoring Client [variable(s): specify their companies Watchman Monitoring Client and group name]; Custom Compliance Scripts [variable(s): specify the name, run period (15 minutes or once per day) and the code as well as remediations scripts]; Application Blacklisting [variable(s): specify the process name, path, developerID and/or bundle ID for applications that should be blocked; specify the message, button label and URL to be presented when application is blocked].

Particular Embodiments

Each embodiment in the following set of embodiments includes a system for deploying configurations on computing devices and validating compliance with the configurations during scheduled intervals, wherein the system comprises a first computing device configured to perform a first method that comprises, during a first time period: sending a request, to a management platform, for a list of configurations that are assigned to the first computing device during the first time period; receiving, from the management platform, the requested list of configurations that are assigned to the first computing device during the first time period, wherein the list includes identifiers of the configurations that are assigned to the first computing device during the first time period; receiving, from the management platform, any values of variables associated with configurations in the list of configurations that are assigned to the first computing device during the first time period; and using the received list of configurations that are assigned to the first computing device during the first time period to determine if each of the configurations in that list are implemented.

In a first embodiment of the set, the first method comprises, during a second time period: sending another request, to management platform, for a list of configurations that are assigned to the first computing device during the second time period; receiving, from the management platform, the requested list of configurations that are assigned to the first computing device during the second time period, wherein the list includes identifiers of the configurations that are assigned to the first computing device during the second time period; receiving, from the management platform, any values of variables associated with configurations in the list of configurations that are assigned to the first computing device during the second time period; and using the received list of configurations that are assigned to the first computing device during the second time period to determine if each of the configurations in that list are implemented.

In a second embodiment of the set, the first method comprises: if a determination is made that a first configuration assigned to the first computing device is not implemented, implementing the first configuration on the first computing device.

In a third embodiment of the set, the first method comprises: responsive to determining that a first configuration assigned to the first computing device is not implemented, implementing the first configuration on the first computing device using a first value of a first variable, from received values of variables associated with configurations in the list of configurations, that is associated with the first configuration.

In a fourth embodiment of the set, the first method comprises: if a determination is made that a first configuration assigned to the first computing device is not implemented, determining if a first set of executable instructions that are configured to implement the first configuration on the first computing device are stored on the first computing device; if the first set of executable instructions are stored on the first computing device, implementing the first configuration on the first computing device by executing the first set of executable instructions; and if the first set of executable instructions are not stored on the first computing device: (i) requesting the first set of executable instructions from the management platform, (ii) receiving the first set of executable instructions from the management platform, and (iii) implementing the first configuration on the first computing device by executing first set of executable instructions.

In a fifth embodiment of the set, the system comprises a management platform configured to perform a second method that comprises: providing a first collection of available configurations to a first administrator device of a first enterprise; receiving, from the first administrator device, a first set of configurations that were selected from the first collection of available configurations; receiving, from the first administrator device, a first group of computing devices to which the first set of configurations are to be applied, wherein the first group of computing devices includes the first computing device; receiving, from the first administrator device, any values of variables associated with any configurations from the first set of configurations; storing a first set of configuration identifiers that identify configurations in the first set of configurations; storing any received values of variables associated with any configurations from the first set of configurations; and storing an association between the first set of configuration identifiers and each computing device in the first group of computing devices.

In one implementation of the fifth embodiment, the second method is performed before the first method.

In another implementation of the fifth embodiment, the first method comprises (i) if a determination is made that a first configuration assigned to the first computing device is not implemented, generate data specifying that the first configuration is not implemented on the first computing device, and transmitting the generated data to the management platform, and the second method comprises (i) receiving the generated data from the first computing device, (ii) using the generated data to generate a report that indicates the first configuration is not implemented on the first computing device, and (iii) providing the report to the first administrator device.

In another implementation of the fifth embodiment, the second method comprises: receiving a request from the first computing device for the list of configurations assigned to the first computing device during the first time period; responsive to the request, identifying the first set of configuration identifiers; transmitting, to the first computing device, the first set of configuration identifiers; and retrieving any values of variables associated with any configurations from the first set of configurations and transmitting any retrieved values to the first computing device.

In another implementation of the fifth embodiment, the system includes a data source that stores different predefined collections of configurations from the available configurations that each represent a different security standard, and the second method comprises: receiving, from the first administrator device, a selection of a predefined collection of configurations that is based on a security standard, wherein the first collection of available configurations includes the predefined collection of configurations, and wherein the first collection of available configurations is provided responsive to receiving the selection of the predefined collection of configurations.

In another implementation of the fifth embodiment, the second method comprises: providing a second collection of available configurations to a second administrator device of a second enterprise; receiving, from the second administrator device, a second set of configurations that were selected from the second collection of available configurations; receiving, from the second administrator device, a second group of computing devices to which the second set of configurations are to be applied, wherein the second group of computing devices does not include the first computing device; receiving, from the second administrator device, any values of variables associated with any configurations from the second set of configurations; storing a second set of configuration identifiers that identify configurations in the second set of configurations; storing any received values of variables associated with any configurations from the second set of configurations; and storing an association between each computing device in the second group of computing devices and the second set of configuration identifiers, wherein the first and second enterprises are different enterprises.

In another implementation of the fifth embodiment, the first computing device includes a first memory storing a first set of machine-executable instructions, wherein execution of the first set of machine-executable instructions causes one or more machines of the first computing device to perform the first method, and wherein the management platform includes a second memory storing a second set of machine-executable instructions, wherein execution of the second set of machine-executable instructions causes one or more machines of the management platform to perform the second method.

Other Aspects

Any method (also referred to as a "process" or an "approach") described or otherwise enabled by disclosure herein may be implemented by hardware components (e.g., machines), software modules (e.g., stored in machine-readable media), or a combination thereof. In particular, any method described or otherwise enabled by disclosure herein may be implemented by any concrete and tangible system described herein. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. Computing devices may include different devices, including a hand-held device, a laptop or notebook computer, a desktop computer, a personal digital assistant, a tablet, or other suitable computing device. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media, including but not limited to one or more non-volatile or volatile storage media, removable or non-removable media, integrated circuit media, magnetic storage media, optical storage media, or any other storage media, including RAM, ROM, and EEPROM, that may be patented under the laws of the jurisdiction in which this application is filed, but does not include machine-readable media that cannot be patented under the laws of the jurisdiction in which this application is filed (e.g., transitory propagating signals). Methods disclosed herein provide sets of rules that are performed. Systems that include one or more machines and one or more non-transitory machine-readable media for implementing any method described herein are also contemplated herein. One or more machines that perform or implement, or are configured, operable or adapted to perform or implement operations comprising the steps of any methods described herein are also contemplated herein. Each method described herein that is not prior art represents a specific set of rules in a process flow that provides significant advantages in the field of deploying configurations on computing devices and validating compliance with the configurations during scheduled intervals. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

The invention claimed is:

1. A system comprising for deploying configurations on computing devices and validating compliance with the configurations during scheduled intervals, wherein the system comprises:
    a first computing device configured to perform a first method, the first method being for deploying the configurations and validating compliance with the configurations,
    wherein the first method comprises, during a first time period corresponding to a first scheduled interval:
        (i) sending a first request, to a management platform, for a first list of the configurations that are assigned to the first computing device during the first time period;
        (ii) receiving, from the management platform, the requested first list of the configurations that are assigned to the first computing device during the first time period,
        wherein the first list includes first identifiers of the configurations that are assigned to the first computing device during the first time period;
        (iii) receiving, from the management platform, a first any values of variables associated with the configurations in the first list of the configurations that are assigned to the first computing device during the first time period; and
        (iv) using the received first list of the configurations that are assigned to the first computing device during the first time period to determine if each of the configurations in that the first list are implemented.

2. The system of claim 1, wherein the first method comprises,
    during a second time period corresponding to a second scheduled interval:
    sending a second request, to the management platform, for a second list of the configurations that are assigned to the first computing device during the second time period;
    receiving, from the management platform, the requested second list of the configurations that are assigned to the first computing device during the second time period,
    wherein the second list includes second identifiers of the configurations that are assigned to the first computing device during the second time period;
    receiving, from the management platform, a second any values of variables associated with the configurations in the second list of the configurations that are assigned to the first computing device during the second time period; and
    using the received second list of the configurations that are assigned to the first computing device during the second time period to determine if each of the configurations in that the second list are implemented.

3. The system of claim 1, wherein the first method comprises:
    if a determination is made that a first configuration assigned to the first computing device is not implemented, implementing the first configuration on the first computing device.

4. The system of claim 1, wherein the first method comprises:
    responsive to determining that a first configuration assigned to the first computing device is not implemented, implementing the first configuration on the first computing device using a first value of a first variable, from the received first any values of variables associated with the configurations in the first list of the configurations, that is associated with the first configuration.

5. The system of claim 1, wherein the first method comprises:
    if a determination is made that a first configuration assigned to the first computing device is not implemented, determining if a first set of executable instructions that are configured to implement the first configuration on the first computing device are stored on the first computing device;
    if the first set of executable instructions are stored on the first computing device, implementing the first configuration on the first computing device by executing the first set of executable instructions; and
    if the first set of executable instructions are not stored on the first computing device:
        (i) requesting the first set of executable instructions from the management platform,
        (ii) receiving the first set of executable instructions from the management platform, and
        (iii) implementing the first configuration on the first computing device by executing the first set of executable instructions.

6. The system of claim 1, wherein the system comprises:
    the management platform configured to perform a second method, wherein the second method comprises:
        (i) providing a first collection of available configurations to a first administrator device of a first enterprise;
        (ii) receiving, from the first administrator device, a first set of the configurations that were selected from the first collection of available configurations;
        (iii) receiving, from the first administrator device, a first group of computing devices to which the first set of the configurations are to be applied,
        wherein the first group of computing devices includes the first computing device;
        (iv) receiving, from the first administrator device, the first any values of variables associated with the any configurations from the first set of the configurations;
        (v) storing a first set of configuration identifiers that identify the configurations in the first set of the configurations;
        (vi) storing the first any received values of variables associated with the any configurations from the first set of the configurations; and
        (vii) storing an association between the first set of configuration identifiers and each computing device in the first group of computing devices.

7. The system of claim 6, wherein the second method is performed before the first method.

8. The system of claim 6,
wherein the first method comprises:
(i) if a determination is made that a first configuration assigned to the first computing device is not implemented, generate data specifying that the first configuration is not implemented on the first computing device, and transmitting the generated data to the management platform; and
wherein the second method comprises:
(i) receiving the generated data from the first computing device;
(ii) using the generated data to generate a report that indicates the first configuration is not implemented on the first computing device; and
(iii) providing the report to the first administrator device.

9. The system of claim 6, wherein the second method comprises:
receiving a third request from the first computing device for the first list of the configurations assigned to the first computing device during the first time period;
responsive to the third request, identifying the first set of configuration identifiers;
transmitting, to the first computing device, the first set of configuration identifiers; and
retrieving the first any values of variables associated with the any configurations from the first set of the configurations and transmitting any retrieved values to the first computing device.

10. The system of claim 6, wherein the system includes a data source that stores different predefined collections of the configurations from the available configurations that each represent a different security standard, wherein the second method comprises:
receiving, from the first administrator device, a selection of a predefined collection of the configurations that is based on a security standard,
wherein the first collection of available configurations includes the predefined collection of the configurations, and
wherein the first collection of available configurations is provided responsive to receiving the selection of the predefined collection of the configurations.

11. The system of claim 6, wherein the second method comprises:
providing a second collection of available configurations to a second administrator device of a second enterprise;
receiving, from the second administrator device, a second set of the configurations that were selected from the second collection of available configurations;
receiving, from the second administrator device, a second group of computing devices to which the second set of the configurations are to be applied,
wherein the second group of computing devices does not include the first computing device;
receiving, from the second administrator device, a second any values of variables associated with the any configurations from the second set of the configurations;
storing a second set of configuration identifiers that identify the configurations in the second set of the configurations;
storing the second any received values of variables associated with the any configurations from the second set of the configurations; and
storing an association between each computing device in the second group of computing devices and the second set of configuration identifiers,
wherein the first enterprise and the second enterprise are different enterprises.

12. The system of claim 6,
wherein the first computing device includes a first memory storing a first set of machine-executable instructions,
wherein execution of the first set of machine executable instructions causes one or more machines of the first computing device to perform the first method, and
wherein the management platform includes a second memory storing a second set of machine-executable instructions,
wherein execution of the second set of machine-executable instructions causes the one or more machines of the management platform to perform the second method.

13. A method, wherein the method comprises:
during a first time period corresponding to a first scheduled interval at a first computing device, deploying configurations on computing devices and validating compliance with the configurations by:
(i) sending a first request, to a management platform, for a first list of the configurations that are assigned to the first computing device during the first time period;
(ii) receiving, from the management platform, the requested first list of the configurations that are assigned to the first computing device during the first time period,
wherein the first list includes first identifiers of the configurations that are assigned to the first computing device during the first time period;
(iii) receiving, from the management platform, a first any values of variables associated with the configurations in the first list of the configurations that are assigned to the first computing device during the first time period; and
(iv) using the received first list of the configurations that are assigned to the first computing device during the first time period to determine if each of the configurations in that first list are implemented.

14. The method of claim 13, wherein the method comprises:
during a second time period corresponding to a second scheduled interval at the first computing device:
(i) sending a second request, to the management platform, for a second list of the configurations that are assigned to the first computing device during the second time period;
(ii) receiving, from the management platform, the requested second list of the configurations that are assigned to the first computing device during the second time period,
wherein the second list includes second identifiers of the configurations that are assigned to the first computing device during the second time period;
(iii) receiving, from the management platform, a second any values of variables associated with the configurations in the second list of the configurations that are assigned to the first computing device during the second time period; and
(iv) using the received second list of the configurations that are assigned to the first computing device during the second time period to determine if each of the configurations in that the second list are implemented.

15. The method of claim 13, wherein the method comprises:
at the management platform:
(i) providing a first collection of available configurations to a first administrator device of a first enterprise;
(ii) receiving, from the first administrator device, a first set of the configurations that were selected from the first collection of available configurations;
(iii) receiving, from the first administrator device, a first group of computing devices to which the first set of the configurations are to be applied,
wherein the first group of computing devices includes the first computing device;
(iv) receiving, from the first administrator device, a first any values of variables associated with any configurations from the first set of the configurations;
(v) storing a first set of configuration identifiers that identify the configurations in the first set of the configurations;
(vi) storing the any received values of variables associated with the any configurations from the first set of the configurations; and
(vii) storing an association between the first set of configuration identifiers and each computing device in the first group of computing devices.

16. The method of claim 15 wherein the method comprises:
at the first computing device:
(i) if a determination is made that a first configuration assigned to the first computing device is not implemented, generate data specifying that the first configuration is not implemented on the first computing device, and transmitting the generated data to the management platform; and
at the management platform:
(i) receiving the generated data from the first computing device;
(ii) using the generated data to generate a report that indicates the first configuration is not implemented on the first computing device; and
providing the report to the first administrator device.

17. One or more non-transitory machine-readable media embodying program instructions that, when executed by one or more machines, cause the one or more machines to implement a method for deploying configurations on computing devices and validating compliance with the configurations during scheduled intervals, wherein the method comprises:
during a first time period corresponding to a first scheduled interval at a first computing device deploying the configurations on computing devices and validating compliance with the configurations by:
(i) sending a first request, to a management platform, for a first list of the configurations that are assigned to the first computing device during the first time period;
(ii) receiving, from the management platform, the requested first list of the configurations that are assigned to the first computing device during the first time period,
wherein the first list includes identifiers of the configurations that are assigned to the first computing device during the first time period;
(iii) receiving, from the management platform, a first any values of variables associated with the configurations in the first list of the configurations that are assigned to the first computing device during the first time period; and
(iv) using the received first list of the configurations that are assigned to the first computing device during the first time period to determine if each of the configurations in that the first list are implemented.

18. The one or more non-transitory machine-readable media of claim 17, wherein the method comprises:
during a second time period corresponding to a second scheduled interval at the first computing device:
(i) sending a second request, to the management platform, for a second list of the configurations that are assigned to the first computing device during the second time period;
(ii) receiving, from the management platform, the requested second list of the configurations that are assigned to the first computing device during the second time period,
wherein the second list includes identifiers of the configurations that are assigned to the first computing device during the second time period;
(iii) receiving, from the management platform, a second any values of variables associated with the configurations in the second list of the configurations that are assigned to the first computing device during the second time period; and
(iv) using the received second list of the configurations that are assigned to the first computing device during the second time period to determine if each of the configurations in that the second list are implemented.

19. The one or more non-transitory machine-readable media of claim 17, wherein the method comprises:
at the management platform:
(i) providing a first collection of available configurations to a first administrator device of a first enterprise;
(ii) receiving, from the first administrator device, a first set of the configurations that were selected from the first collection of available configurations;
(iii) receiving, from the first administrator device, a first group of computing devices to which the first set of the configurations are to be applied,
wherein the first group of computing devices includes the first computing device;
(iv) receiving, from the first administrator device, the first any values of variables associated with any configurations from the first set of the configurations;
(v) storing a first set of configuration identifiers that identify the configurations in the first set of the configurations;
(vi) storing any received values of variables associated with the any configurations from the first set of the configurations; and
(vii) storing an association between the first set of configuration identifiers and each computing device in the first group of computing devices.

20. The one or more non-transitory machine-readable media of claim 19, wherein the method comprises:
at the first computing device:
(i) if a determination is made that a first configuration assigned to the first computing device is not implemented, generate data specifying that the first configuration is not implemented on the first computing device, and transmitting the generated data to the management platform; and at the management platform:
(i) receiving the generated data from the first computing device;
(ii) using the generated data to generate a report that indicates the first configuration is not implemented on the first computing device; and providing the report to the first administrator device.

* * * * *